(12) United States Patent
Yue

(10) Patent No.: US 11,294,901 B1
(45) Date of Patent: Apr. 5, 2022

(54) ISOLATING THE PERFORMANCE OF FUNCTIONS INCLUDED IN QUERIES

(71) Applicant: Amazon Technologies, Inc., Seattle, WA (US)

(72) Inventor: Yuanyuan Yue, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 150 days.

(21) Appl. No.: 15/587,283

(22) Filed: May 4, 2017

(51) Int. Cl.
*G06F 16/2453* (2019.01)

(52) U.S. Cl.
CPC .............. *G06F 16/24542* (2019.01)

(58) Field of Classification Search
CPC ........... G06F 16/24542; G06F 16/2453; G06F 16/242; G06F 16/248; G06F 16/24575; G06F 16/2465; G06F 21/53
See application file for complete search history.

(56) References Cited

U.S. PATENT DOCUMENTS

| | | | |
|---|---|---|---|
| 6,212,511 B1 | 4/2001 | Fisher et al. | |
| 6,253,368 B1 | 6/2001 | Nelin et al. | |
| 6,594,651 B2 | 7/2003 | Kabra et al. | |
| 6,976,029 B2 | 12/2005 | Venkatesh et al. | |
| 7,376,656 B2 | 5/2008 | Blakeley et al. | |
| 7,500,225 B2 | 3/2009 | Khan et al. | |
| 7,631,296 B2 | 12/2009 | Seshadri et al. | |
| 7,840,653 B1* | 11/2010 | Cortes, Jr. ........... | H04L 41/0816 709/220 |
| 7,984,043 B1* | 7/2011 | Waas ................... | G06F 16/8358 707/718 |
| 9,026,525 B2* | 5/2015 | Harren ................ | G06F 16/24542 707/718 |
| 9,256,646 B2* | 2/2016 | Deshmukh ........ | G06F 16/24568 |
| 2006/0080646 A1* | 4/2006 | Aman .................... | G06F 9/453 717/143 |
| 2009/0106198 A1* | 4/2009 | Srinivasan ........ | G06F 16/24556 |
| 2010/0036801 A1* | 2/2010 | Pirvali ............... | G06F 16/24534 707/713 |
| 2012/0059876 A1* | 3/2012 | Chinta ..................... | G06F 21/53 709/203 |
| 2014/0172960 A1* | 6/2014 | Lee ....................... | G06F 9/5077 709/203 |
| 2015/0227588 A1* | 8/2015 | Shapira ................ | G06F 16/9535 707/722 |
| 2015/0379013 A1* | 12/2015 | Purcell ................ | G06F 16/3329 707/708 |
| 2017/0091269 A1* | 3/2017 | Zhu ...................... | G06F 16/2453 |
| 2017/0116210 A1* | 4/2017 | Park ..................... | G06F 11/1471 |
| 2018/0197125 A1* | 7/2018 | Standefer, III ..... | G06Q 10/0633 |

* cited by examiner

*Primary Examiner* — James Trujillo
*Assistant Examiner* — Michal Bogacki
(74) *Attorney, Agent, or Firm* — Robert C. Kowert; Kowert, Hood, Munyon, Rankin & Goetzel, P.C.

(57) ABSTRACT

The performance of functions included in a query may be isolated from the performance of the query. A query may be received and a function within the query may be identified. Execution of the function may be isolated from the performance of the query. In some embodiments, a remote execution engine or service may perform the function in response to a request invoking performance of the function generated as part of executing a query execution plan for the query. Results from the function may be received and a result for the query provided based on the results of the function.

20 Claims, 15 Drawing Sheets

ISOLATING THE PERFORMANCE OF FUNCTIONS INCLUDED IN QUERIES

BACKGROUND

Computing systems for querying of large sets of data can be extremely difficult to implement and maintain. In many scenarios, for example, it is necessary to first create and configure the infrastructure (e.g. server computers, storage devices, networking devices, etc.) to be used for the querying operations. It might then be necessary to perform extract, transform, and load ("ETL") operations to obtain data from a source system and place the data in data storage. It can also be complex and time consuming to install, configure, and maintain the database management system ("DBMS") that performs the query operations. Moreover, many DBMS are not suitable for querying extremely large data sets in a performant manner.

Computing clusters can be utilized in some scenarios to query large data sets in a performant manner. For instance, a computing cluster can have many nodes that each execute a distributed query framework for performing distributed querying of a large data set. Such computing clusters and distributed query frameworks are, however, also difficult to implement, configure, and maintain. Moreover, incorrect configuration and/or use of computing clusters such as these can result in the non-optimal utilization of processor, storage, network and, potentially, other types of computing resources.

The disclosure made herein is presented with respect to these and other considerations.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Figure 1:
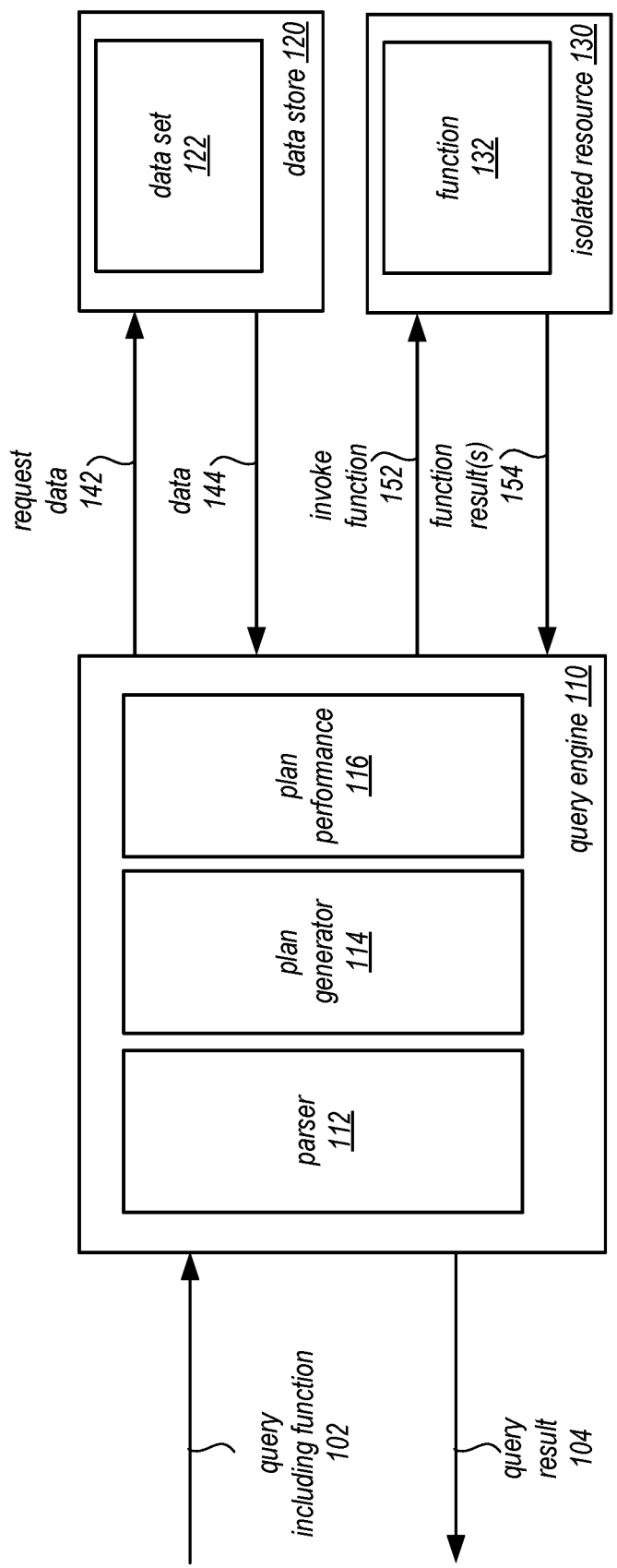
FIG. 1 illustrates a logical block diagram of isolating the performance of functions included in queries, according to some embodiments.

Various embodiments of isolating the performance of functions included in queries as described herein. Query interfaces, specifications, or languages may include a standardized or common set of operations or other functions that may be performed in order to access data, in some embodiments. While the standard set of functions may be useful in some circumstances for accessing data, other functions that may be custom, application-specific, user-specific, or query-specific can expand the capability of queries to perform additional types of analyses and operations, in some embodiments. In order to safely execute functions not included in a standard set of functions or operations supported by a query language, query engine, or other query processing environment, such functions may be executed in isolation from the execution from other portions of the query that also includes the function, in various embodiments. In this way, malicious or defective code that implements the non-standard set of functions may be prevented from interfering with the operation of the query or prevent from accessing data without authorization. FIG. 1 illustrates a logical block diagram of isolating the performance of functions included in queries, according to some embodiments.

Query engine 110 may process queries received from clients that are directed to a data set 122 stored in a data store 120. In some embodiments, query engine 110 may be implemented as part of a stand-alone database or query processing system that access directly attached or exclusively accessible storage in order to process queries (e.g., a MySQL database server accessing network attached storage that stores database tables managed by the MySQL database server). In other embodiments, query engine 110 may be implemented as part of a network-based service, such as the services discussed below with regard to FIGS. 2-9, including a database service or a managed query execution service that manages the execution of queries stored in separate data storage systems or services.

In at least some embodiments, query engine 110 may implement a parser 112 to parse received queries, a plan generator 114 to generate a query execution plan to perform queries, and plan performance 116 to perform a generated and selected query execution plan. As illustrated in FIG. 1, a query including a function 102 may be received, in one embodiment. Parser 112 may examine the query and generate a parse tree or other data structure to determine the operations or functions requested in query 102, in one embodiment. Query parser 112 may recognize functions that are not included in the standard set of functions in the query language(s), interfaces, or protocols supported by query engine 110, in one embodiment. For example, parser 112 may compare identified functions or operations with local libraries, or other lists, implementing the identified functions, in one embodiment. For functions that are not locally implemented, parser 112 may flag or otherwise mark the function for isolated execution, in some embodiments.

Plan generator 114 may receive the parse tree or other data structure identifying the operations or functions of query 102. For functions marked or identified for isolated execution, plan generator 114 may obtain information that maps the marked function to an isolated resource that can perform the function, in one embodiment. For example, as discussed below with regard to FIGS. 5 and 7, function mapping information may be maintained that maps a function identifier obtained from the query (e.g., a keyword or other textual identifier included in the statement or text of the query) to isolated resource 130 for performing the function 130 (e.g., a separate software container, a separate virtual machine, a separate physical machine, a separate remote system, or a separate network service), in one embodiment. As discussed below in FIG. 5, users may create the mappings, in some embodiments, in order to customize the execution of queries with user-specified functions, such as function 132. Similarly, users may create, code, generate or author code, compile code and submit binaries or other executables, or otherwise provide the function 132 to isolated resource 130.

Plan generator 114 may generate a query execution plan that includes various instructions to carry out the performance of query 102 (e.g., by performing rules-based optimizations, cost-based optimizations, and/or selections), in some embodiments. The query execution plan may include operations or instructions to independently perform and/or isolate the execution of the marked function, such as function 132, as discussed below with regard to FIG. 9B, in some embodiments. For example, the operation may include the information to generate and send a request to invoke or trigger the performance of function 132 so that plan execution 116 may correctly cause the performance of the function. Plan execution 116 may perform the query execution plan, including the performance of various operations to request data 142 from data set 122, receive data 144 from data set 122, invoke 152 the performance of function 132 at isolated resource 130, and process received function result(s) 154, in various embodiments. For example, the identified function may perform a transformation of data values received as part of data 144 from data set 122 (e.g., from one data type to another, extract a portion of a larger value, convert the value from one measurement to another, etc.), a validation of data values received as part of data 144 from data set 122 (e.g., does the name, address, and identifier name represent an authorized user), an analysis of data values (e.g., statistical operations like time series analysis, aggregation operations, etc.), invoke the performance of other network-based services, systems, or components, as discussed below with regard to FIG. 7, or any other operation that may be performed as part of the function such the results can be interpreted, processed, or incorporated by plan execution 116, in some embodiments. Plan execution 116 may generate a result 104 for the query that may be based, at least in part, on the function result(s) 154 which may then be returned in response to query 102, in some embodiments.

Please note that the previous description of isolating the performance of functions included in queries is a logical illustration and thus is not to be construed as limiting as to the implementation of a query engine, data store, data set, isolated resource, or function. For example, in some embodiments, multiple functions and or multiple isolated resources may be implemented to perform functions included in a query.

This specification begins with a general description of a provider network that implements a managed query service that execute queries that may include functions to be independently and/or in isolation at event driven compute service. Then various examples of the managed query service and event driven compute service (along with other services that may be utilized or implemented) including different components/modules, or arrangements of components/module that may be employed as part of implementing the services are discussed. A number of different methods and techniques to implement isolating the performance of functions included in queries are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
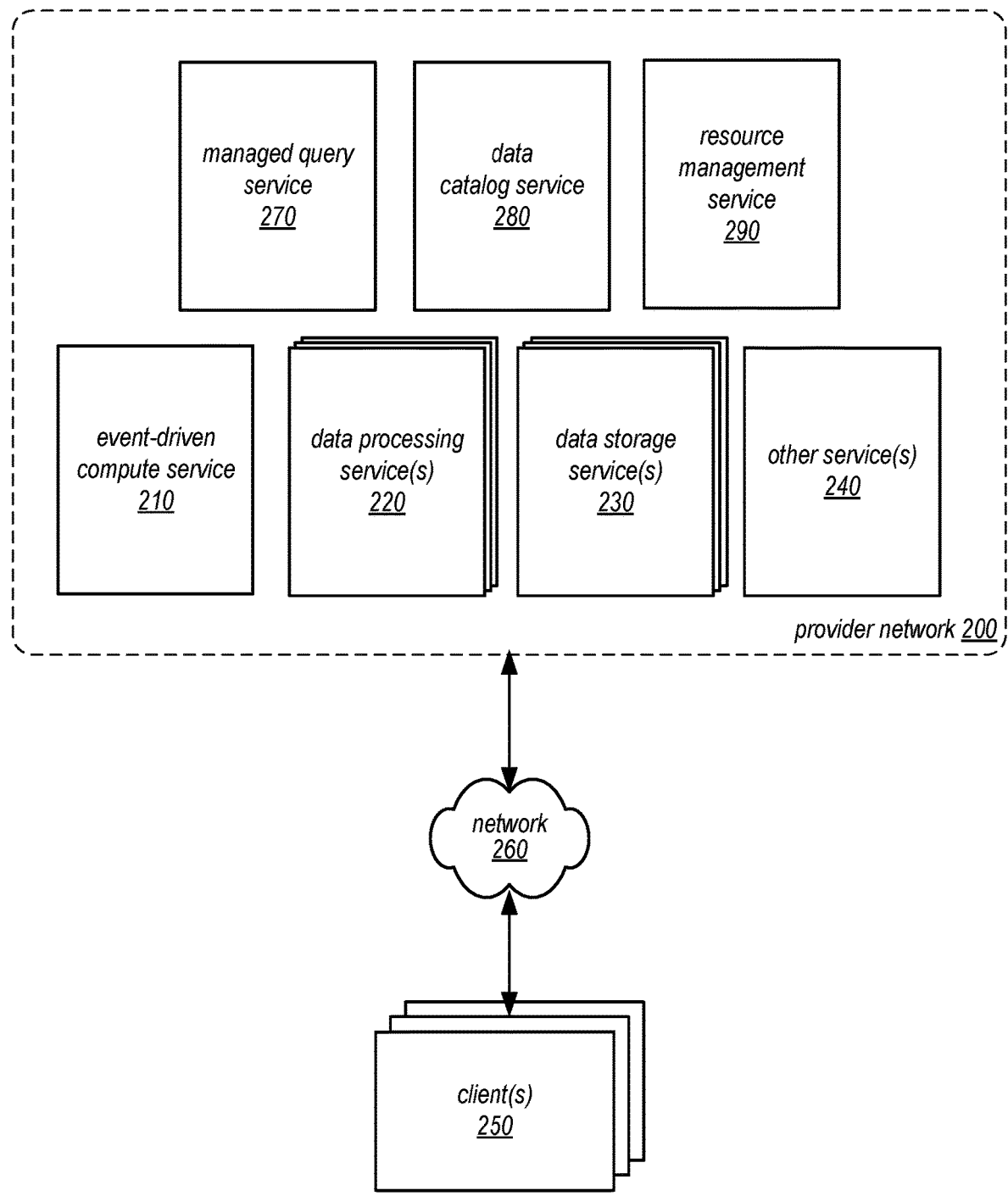
FIG. 2 is a logical block diagram illustrating a provider network implementing a managed query service that executes queries on behalf of clients and an event driven computing service that executes functions included in queries submitted to the managed query service, according to some embodiments.

FIG. 2 is a logical block diagram illustrating a provider network implementing a managed query service that executes queries on behalf of clients and an event driven computing service that executes functions included in queries submitted to the managed query service, according to some embodiments. Provider network 200 may be a private or closed system or may be set up by an entity such as a company or a public sector organization to provide one or more services (such as various types of cloud-based storage) accessible via the Internet and/or other networks to clients 250, in some embodiments. Provider network 200 may be implemented in a single location or may include numerous data centers hosting various resource pools, such as collections of physical and/or virtualized computer servers, storage devices, networking equipment and the like (e.g., FIGS. 14, 15 and computing system 2000 described below with regard to FIG. 15), needed to implement and distribute the infrastructure and storage services offered by the provider network 200. In some embodiments, provider network 200 may implement various computing resources or services, such as event driven compute service 210, data processing service(s) 220, (e.g., relational or non-relational (NoSQL) database query engines, map reduce processing, data flow processing, and/or other large scale data processing techniques), data storage service(s) 230, (e.g., an object storage service, block-based storage service, or data storage service that may store different types of data for centralized access) other services 240 (any other type of network based services (which may include various other types of storage, processing, analysis, communication, event handling, visualization, and security services not illustrated), managed query service 270, data catalog service 280, and resource management service 290.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 15 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Event driven compute service 210 may be implemented by provider network 200, in some embodiments. Event-driven compute service 210 may maintain a pool of pre-initialized virtual machine instances that are ready for use as soon as a request is received to execute a function or other program code, in various embodiments. Event driven compute service 210 may maintain a pool of virtual machine instances that have one or more software components (e.g., operating systems, language runtimes, libraries, etc.) loaded thereon. The virtual machine instances in the pool may designated to service requests to execute functions or other program codes, in some embodiments. The functions or other program codes can be executed in isolated containers that are created on the virtual machine instances, in some embodiments, or separate physical servers, hosts, or computing devices. Since the virtual machine instances in the pool have already been booted and loaded with particular operating systems and language runtimes by the time the requests are received, a delay associated with finding compute capacity that can handle the requests (e.g., by executing the functions or other program codes in one or more containers created on the virtual machine instances) may be significantly reduced, in some embodiments.

Figure 7:
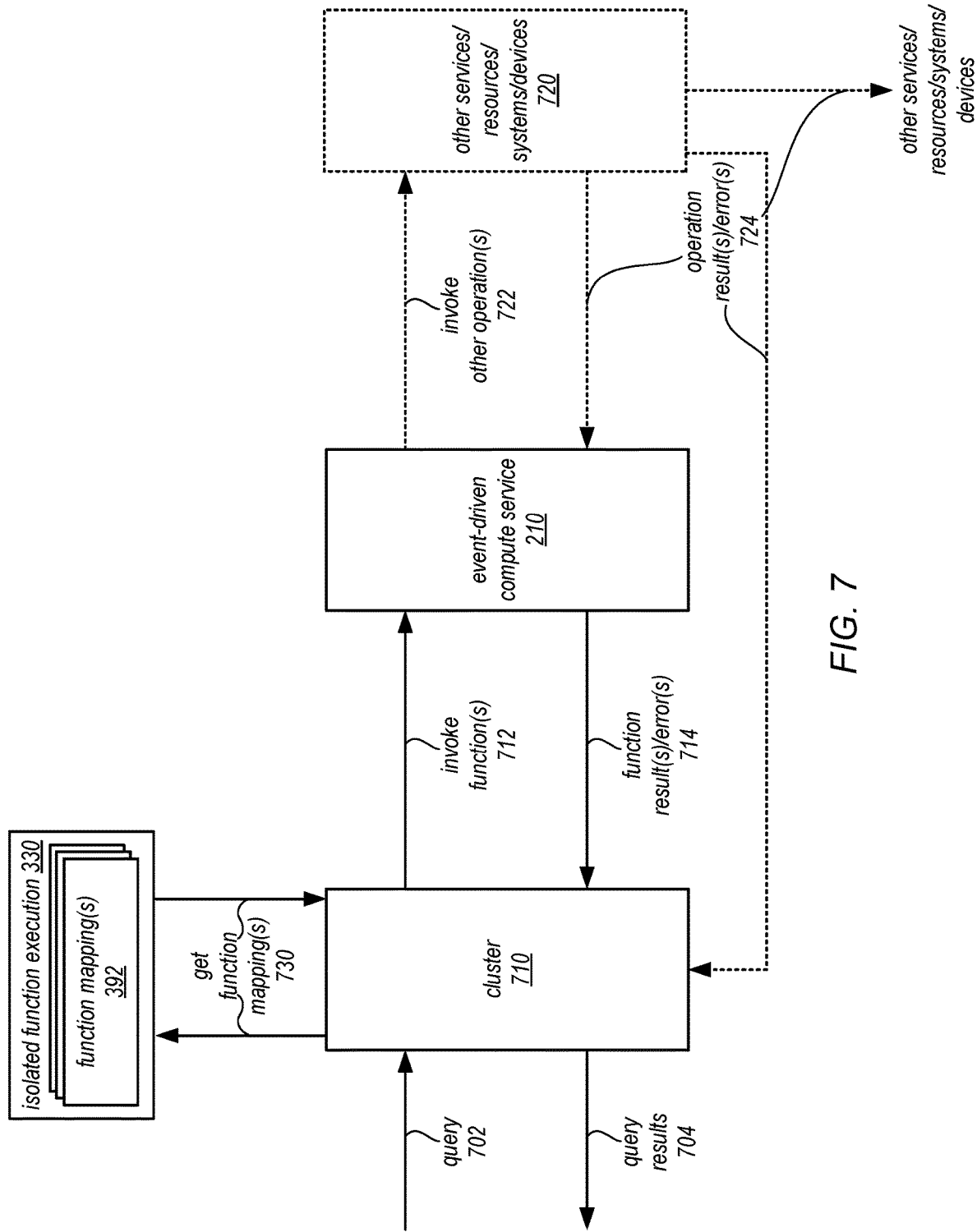
FIG. 7 is a logical block diagram illustrating interactions between a cluster processing a query and an event driven computing service to invoke isolated execution of functions, according to some embodiments.

In some embodiments, event-driven compute service 210 may facilitate transportation or communication of event messages generated in a first programmatic environment (e.g., at another service, such as managed query service 270 as discussed below with regard to FIG. 7). To further facilitate propagation and transportation of a triggered event from the first programmatic environment to event driven compute service 210, event messages may be generated to include information descriptive of the triggered event, a user associated with a request to execute functions or other program codes in response to the triggered event, and programmatic information to enable the event driven compute service 210 to convert the event message into a request for further processing by event driven compute service 210. The event message and/or programmatic information contained therein may be structured according to a schema, a code model, or an application programming interface ("API"), console, command-line or graphical user interface or any other interface to facilitate both creation/generation of the event message at the auxiliary service and conversion/processing of the event message at event driven compute service 210, in some embodiments.

Event driven compute service 210 may perform automatic rate matching and scaling between events being triggered on an auxiliary service and the corresponding execution of functions or other program codes on various virtual machine instances, in some embodiments. Thus, event driven compute service 210 may be capable of responding to events on-demand, whether the events are triggered infrequently (e.g., once per day) or on a larger scale (e.g., hundreds or thousands per second), in some embodiments. However, in some scenarios various considerations may create a need to impose limitations on the immediate availability of virtual machine instances. For example, the physical computing devices that implement event driven compute service 210 may reach capacity, having allocated all available resources. In another example, event driven compute service's 210 users may have service agreements that limit access to resources, in some embodiments. Event driven compute service 210 may implement a resource allocation limit, such as a limit on concurrently instantiated virtual machines by the user, or on concurrent executions of the user's functions or other program code. Since the requests to execute functions or other program codes may be processed asynchronously, requests for the functions or other program codes (i.e., event messages) that arrive when event-driven compute service 210 is operating at the concurrent execution limit (of, e.g., 50 concurrent executions) may not be rejected, in some embodiments. Event driven compute service 210 or an auxiliary service, such as a message queue service or managed query service 270, may place these messages in a queue to await processing, in some embodiments.

Functions or program code executed by event driven compute service 210 may be any program code (e.g., a program, routine, subroutine, thread, etc.) written in a program language or programming paradigm (e.g., automatically generated code based on user-specified steps, operations, or other representations of functionality), in some embodiments. Such functions or other program codes may be executed to achieve a specific task, in some embodiments—such as in connection with an event generated by a particular web application or mobile application developed by a user that submitted the function or other program code or a function specified in a query submitted to a query engine, such as the query engines processing queries as part of managed query execution service 270 or other network-based database service. For example, the functions or other program codes may be written in JavaScript (node.js), Java, Python, and/or Ruby. The request and/or corresponding event message may include an identifier of the event used to identify the function (and location thereof), and one or more arguments/parameters to be used for executing the function or program code, in one embodiment. For example, the user may provide the function or other program code along with the request to execute the function or program code in response to the occurrence of one or more events, in one embodiment. In another example, the request may identify a previously uploaded function or program code (e.g., using the API for uploading the code as discussed below with regard to FIG. 5) by its name or its unique ID and one or more triggering conditions for executing the function, in one embodiment. In yet another example, the function may be included in the request as well as uploaded in a separate location (e.g., a storage service or a storage system internal to event driven compute service 210) prior to the request is received by event-driven compute service 210, in some embodiments. Event-driven compute service 210 may vary its code execution strategy based on where the code is available at the time the request is processed, in some embodiments.

Data processing services 220 may be various types of data processing services to perform different functions (e.g., query or other processing engines to perform functions such as anomaly detection, machine learning, data lookup, or any other type of data processing operation). For example, in at least some embodiments, data processing services 230 may include a map reduce service that creates clusters of processing nodes that implement map reduce functionality over data stored in one of data storage services 240. Various other distributed processing architectures and techniques may be implemented by data processing services 230 (e.g., grid computing, sharding, distributed hashing, etc.). Note that in some embodiments, data processing operations may be implemented as part of data storage service(s) 230 (e.g., query engines processing requests for specified data). Data processing service(s) 230 may be clients of data catalog service 280 in order to obtain structural information for performing various processing operations with respect to data sets stored in data storage service(s) 230, as provisioned resources in a pool for managed query service 270.

Data catalog service 280 may provide a catalog service that ingests, locates, and identifies data and the schema of data stored on behalf of clients in provider network 200 in data storage services 230, in some embodiments. For example, a data set stored in a non-relational format may be identified along with a container or group in an object-based data store that stores the data set along with other data objects on behalf of a same customer or client of provider network 200, in one embodiment. In at least some embodiments, data catalog service 280 may direct the transformation of data ingested in one data format into another data format. For example, data may be ingested into data storage service 230 as single file or semi-structured set of data (e.g., JavaScript Object Notation (JSON)). Data catalog service 280 may identify the data format, structure, or any other schema information of the single file or semi-structured set of data, in some embodiments. In at least some embodiments, the data stored in another data format may be converted to a different data format as part of a background operation (e.g., to discover the data type, column types, names, delimiters of fields, and/or any other information to construct the table of semi-structured data in order to create a structured version of the data set). Data catalog service 280 may then make the schema information for data available to other services, computing devices, or resources, such as computing resources or clusters configured to process queries with respect to the data, as discussed below with regard to FIGS. 3-8.

Data storage service(s) 230 may implement different types of data stores for storing, accessing, and managing data on behalf of clients 250 as a network-based service that enables clients 250 to operate a data storage system in a cloud or network computing environment. For example, data storage service(s) 230 may include various types of database storage services (both relational and non-relational) for storing, querying, and updating data. Such services may be enterprise-class database systems that are highly scalable and extensible. Queries may be directed to a database in data storage service(s) 230 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 230 may be implemented as a centralized data store so that other data storage services may access data stored in the centralized data store for processing and or storing within the other data storage services, in some embodiments. Data storage service(s) 230 may provide storage and access to various kinds of object or file data stores for putting, updating, and getting various types, sizes, or collections of data objects or files, in some embodiments. Such data storage service(s) 230 may be accessed via programmatic interfaces (e.g., APIs) or graphical user interfaces. A centralized data store may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI), in some embodiments.

In at least some embodiments, one of data storage service(s) 230 may be a data warehouse service that utilizes a centralized data store implemented as part of another data storage service 230. A data warehouse service as may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

Managed query service 270, as discussed below in more detail with regard to FIGS. 3-9, may manage the execution of queries on behalf of clients so that clients may perform queries over data stored in one or multiple locations (e.g., in different data storage services, such as an object store and a database service) without configuring the resources to execute the queries, in various embodiments. Resource management service 290 may manage and provide pools of computing resources for different services like managed query service 270 in order to execute jobs on behalf the different services, in some embodiments.

Generally speaking, clients 250 may encompass any type of client configurable to submit network-based requests to provider network 200 via network 260, including requests for storage services (e.g., a request to create, read, write, obtain, or modify data in data storage service(s) 240, etc.) or managed query service 270 (e.g., a request to query data in a data set stored in data storage service(s) 230 that includes a function stored and executed at event-driven compute service 210). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 240 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment.

Clients 250 may convey network-based services requests (e.g., access requests directed to data in data storage service(s) 230, operations, tasks, or jobs, being performed as part of data processing service(s) 220, queries to managed query service 270, or to interact with data catalog service 280) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
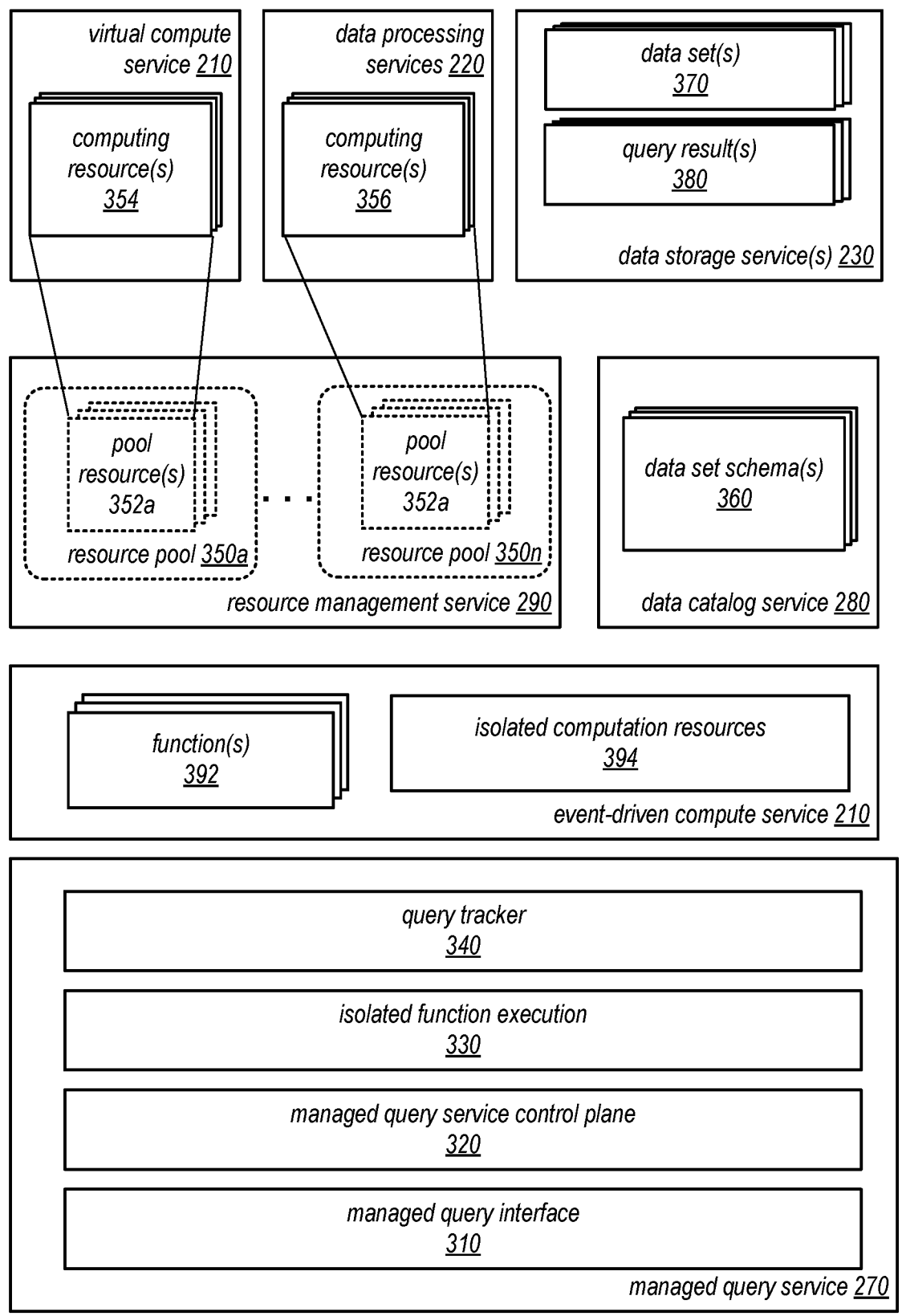
FIG. 3 is a logical block diagram illustrating a managed query service, according to some embodiments.

FIG. 3 is a logical block diagram illustrating a managed query service, according to some embodiments. As discussed below with regard to FIGS. 4-9B, managed query service 270 may leverage the capabilities of various other services in provider network 200. For example, managed query service 270 may utilize resource management service 290 to provision and manage pools of preconfigured resources to execute queries, provide resources of preconfigured queries, and return utilized resources to availability. For example, resource management service 290 may instantiate, configure, and provide resource pool(s) 350a and 350n that include pool resource(s) 352a and 352n from one or more different resource services, such as computing resource(s) 354 in a virtual compute service and computing resource(s) 356 in data processing service(s) 220. Resource management service 290 may send requests to create, configure, tag (or otherwise associate) resources 352 for a particular resource pool, terminate, reboot, otherwise operate resources 352 in order to execute jobs on behalf of other network-based services.

Once a resource from a pool is provided (e.g., by receiving an identifier or other indicator of the resource to utilize), managed query service 270 may interact directly with the resource 354 in virtual compute service 210 or the resource 356 in data processing services 220 to execute queries, in various embodiments. Managed query service 270 may utilize data catalog service 280, in some embodiments to store data set schemas 360, as discussed below with regard to FIG. 4, for subsequent use when processing queries, as discussed below with regard to FIGS. 6-8, in some embodiments. For example, a data set schema may identify the field or column data types of a table as part of a table definition so that a query engine (executing on a computing resource), may be able to understand the data being queried, in some embodiments. Managed query service 270 may also interact with data storage service(s) 230 to directly source data sets 370 or retrieve query results 380, in some embodiments.

Managed query service 270 may implement a managed query interface 310 to handle requests from different client interfaces, as discussed below with regard to FIG. 4. For example, different types of requests, such as requests formatted according to an Application Programmer Interface (API), standard query protocol or connection, or requests received via a hosted graphical user interface implemented as part of managed query service may be handled by managed query interface 310.

Managed query service 270 may implement managed query service control plane 320 to manage the operation of service resources (e.g., request dispatchers for managed query interface 310, isolated function execution 330 to perform identified functions included in queries in isolation and/or independently, or query tracker monitors for query tracker 340). Managed query service control plane 320 may direct requests to appropriate components as discussed below with regard to FIG. 6. Managed query service 270 may implement authentication and authorization controls for handling requests received via managed query interface 310. For example, managed query service control plane 320 may validate the identity or authority of a client to access the data set identified in a query received from a client (e.g., by validating an access credential). In at least some embodiments, managed query service control plane 320 may maintain (in an internal data store or as part of a data set in an external data store, such as in one of data storage service(s)

230), query history, favorite queries, or query execution logs, and other managed query service historical data. Query execution costs may be billed, calculated or reported by managed query service control plane 320 to a billing service (not illustrated) or other system for reporting usage to users of managed query service, in some embodiments.

Managed query service 270 may implement resource planner 330 to intelligently select available computing resources from pools for execution of queries, in some embodiments. For example, resource planner 330 may evaluated collected data statistics associated with query execution (e.g., reported by computing resources) and determine an estimated number or configuration of computing resources for executing a query within some set of parameters (e.g., cost, time, etc.). For example, machine learning techniques may be applied by resource planner 330 to generate a query estimation model that can be applied to the features of a received query to determine the number/configuration of resources, in one embodiment. Resource planner 330 may then provide or identify which ones of the resources available to execute the query from a pool may best fit the estimated number/configuration, in one embodiment.

In various embodiments, managed query service 270 may implement query tracker 340 in order to manage the execution of queries at compute clusters, track the status of queries, and obtain the resources for the execution of queries from resource management service 290. For example, query tracker 340 may maintain a database or other set of tracking information based on updates received from different managed query service agents implemented on provisioned computing resources (e.g., computing clusters as discussed below with regard to FIGS. 5-8).

In various embodiments, managed query service 270 may implement remote function execution 330 which may maintain, manage, and provide function mappings for functions not supported by the computing resource used to execute queries on behalf of managed query service 270, such as user-specified or customized functions, as discussed below with regard to FIG. 5. For example, function mappings may identify function(s) 392 stored and/or executed by event driven compute service 210 using isolated execution resources 394 in response to requests from computing resources processing received queries, in some embodiments.

Figure 4:
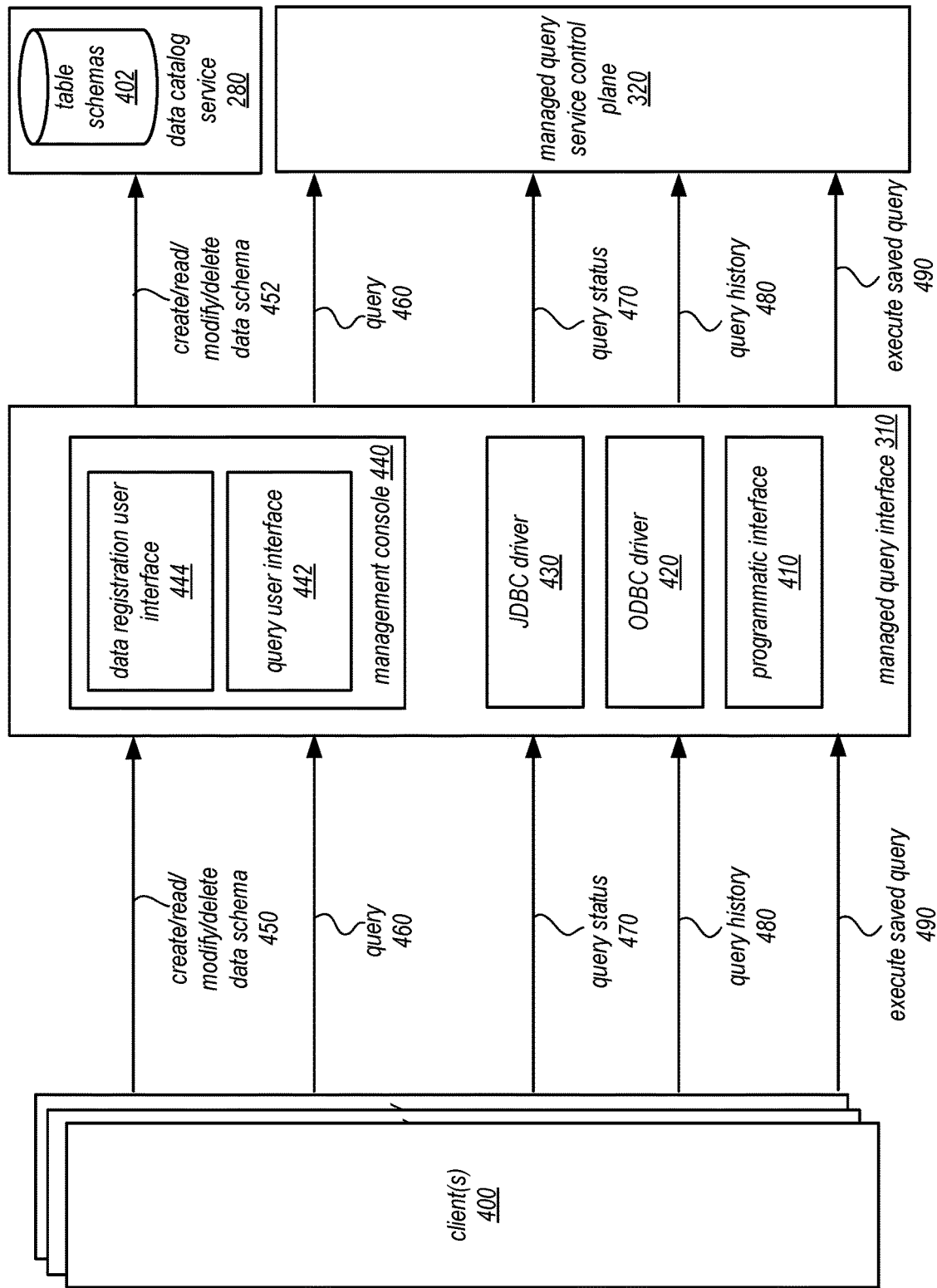
FIG. 4 is a diagram illustrating interactions between clients and a managed query service, according to some embodiments.

FIG. 4 is a diagram illustrating interactions between clients and managed query service, according to some embodiments. Client(s) 400 may be client(s) 250 in FIG. 2 above or other clients (e.g., other services systems or components implemented as part of provider network 200 or as part of an external service, system, or component, such as data exploration or visualization tools (e.g., Tableau, Looker, MicroStrategy, Qliktech, or Spotfire). Clients 400 can send various requests to managed query service 270 via managed query interface 310. Managed query interface 310 may offer a management console 440, which may provider a user interface to submit queries 442 (e.g., graphical or command line user interfaces) or register data schemas 444 for executing queries. For example, management console 440 may be implemented as part of a network-based site (e.g., an Internet website for provider network 200) that provides various graphical user interface elements (e.g., text editing windows, drop-down menus, buttons, wizards or workflows) to submit queries or register data schemas. Managed query interface 310 may implement programmatic interfaces 410 (e.g., various Application Programming Interface (API) commands) to perform queries, and various other illustrated requests. In some embodiments, managed query interface 310 may implement custom drivers that support standard communication protocols for querying data, such as JDBC driver 430 or ODBC driver 420.

Clients 400 can submit many different types of requests to managed query interface 310. For example, in one embodiment, clients 400 can submit requests 450 to create, read, modify, or delete data schemas. For example, a new table schema can be submitted via a request 450. Request 450 may include a name of the data set (e.g., table), a location of the data set (e.g. an object identifier in an object storage service, such as data storage service 230, file path, uniform resource locator, or other location indicator), number of columns, column names, data types for fields or columns (e.g., string, integer, Boolean, timestamp, array, map, custom data types, or compound data types), data format (e.g., formats including, but not limited to, JSON, CSV, AVRO, ORC, PARQUET, tab delimited, comma separated, as well as custom or standard serializers/desrializers), partitions of a data set (e.g., according to time, geographic location, or other dimensions), or any other schema information for process queries with respect to data sets, in various embodiments. In at least some embodiments, request to create/read/modify/delete data set schemas may be performed using a data definition language (DDL), such as Hive Query Language (HQL). Managed query interface 310 may perform respective API calls or other requests 452 with respect to data catalog service 280, to store the schema for the data set (e.g., as part of table schemas 402). Table schemas 402 may be stored in different formats (e.g., Apache Hive). Note, in other embodiments, managed query service 270 may implement its own metadata store.

Clients 400 may also send queries 460 and query status 470 requests to managed query interface 310 which may direct those requests 460 and 470 to managed query service control plane 320, in various embodiments, as discussed below with regard to FIG. 6. Queries 460 may be formatted according to various types of query languages, such as Structured Query Language (SQL) or HQL. Queries may include non-standard or other functions not supported by query processing engines, as discussed below with regard to FIGS. 5, 7, and 9A-12.

Client(s) 400 may also submit requests for query history 480 or other account related query information (e.g., favorite or common queries) which managed query, in some embodiments. In some embodiments, client(s) 400 may programmatically trigger the performance of past queries by sending a request to execute a saved query 490, which managed query service control plane 320 may look-up and execute. For example, execute saved query request may include a pointer or other identifier to a query stored or saved for a particular user account or client. Managed query service control plane 320 may then access that user query store to retrieve and execute the query, in some embodiments.

Figure 5:
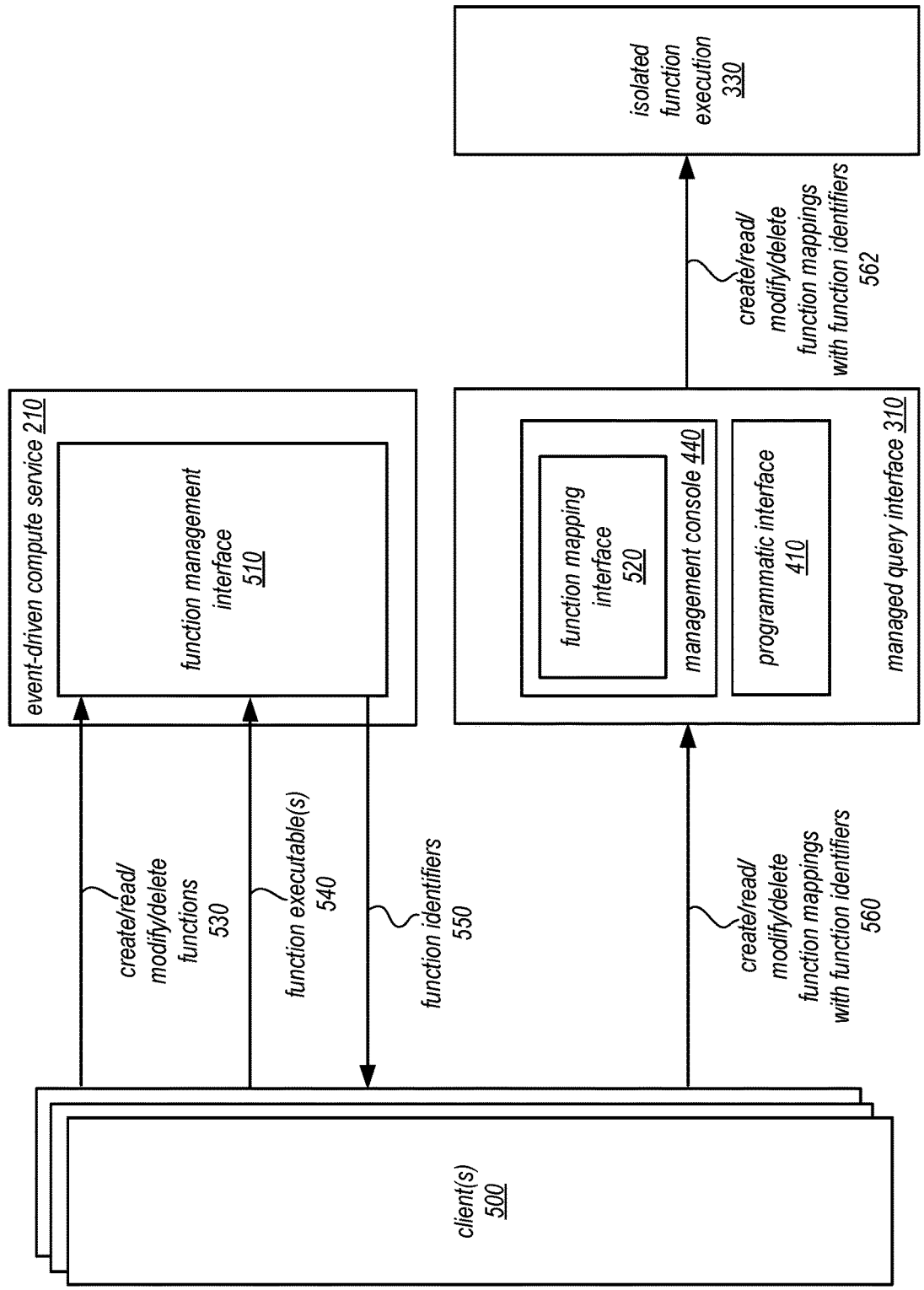
FIG. 5 is a diagram illustrating interactions to create function mappings for invoking isolated performance of functions included in queries, according to some embodiments.

FIG. 5 is a diagram illustrating interactions to create function mappings for invoking isolated performance of functions included in queries, according to some embodiments. Client(s) 500 may be similar to client(s) 400 discussed above with regard to FIG. 4. As noted above with regard to FIG. 2, event driven compute service 210 may execute functions or other program code in response to events or requests, in some embodiments. In at least some embodiments, event-driven compute service 310 may implement a function management interface 510 for client(s) 510 to submit requests. Function management interface 510 may a programmatic interface, such as programmatic interface 410, a management console similar to management console 440, or any other interface that can process requests to event-driven compute service 210.

Function management interface 510 may allow client(s) 500 to submit requests to create, read or access, modify, and/or delete functions 530, in some embodiments. For example, function management interface 510 may implement a text editor that can display code for the function, which client(s) 500 can edit via programmatic interface 510. Various features of the function, such as the parameters, inputs, outputs, triggering events, authorized callers, or other performance information may also be managed via function management interface 510, in some embodiments. In at least some embodiments, function management interface 510 may allow the upload, transmission, or receipt of executable functions 540 (e.g., already compiled code transmitted as a binary file). Event driven compute service 210 may provide function identifiers 550, in various embodiments, that can be provided in a request to event-driven compute service to invoke the execution of a function, as discussed below in FIG. 7.

Client(s) 500 may also submit requests to create, read or access, modify, or delete function mappings 560 with the received function identifiers, in some embodiments. A function mapping may link a function identified in a query with the function to perform at event driven compute service 210, in various embodiments. Function mappings may specify authorized callers or users, parameters, input values, output values, or any other information to invoke execution of the function and handle a function's response (e.g., results or errors). Managed query interface 310 may handle requests to create, read or access, modify, or delete function mappings 560 via programmatic interface 410 or as part of a function mapping interface 520 implemented as part of management console 440, in some embodiments. The requests 560 may be dispatched 562 to isolated function execution 330 for storage, in some embodiments.

Figure 6:
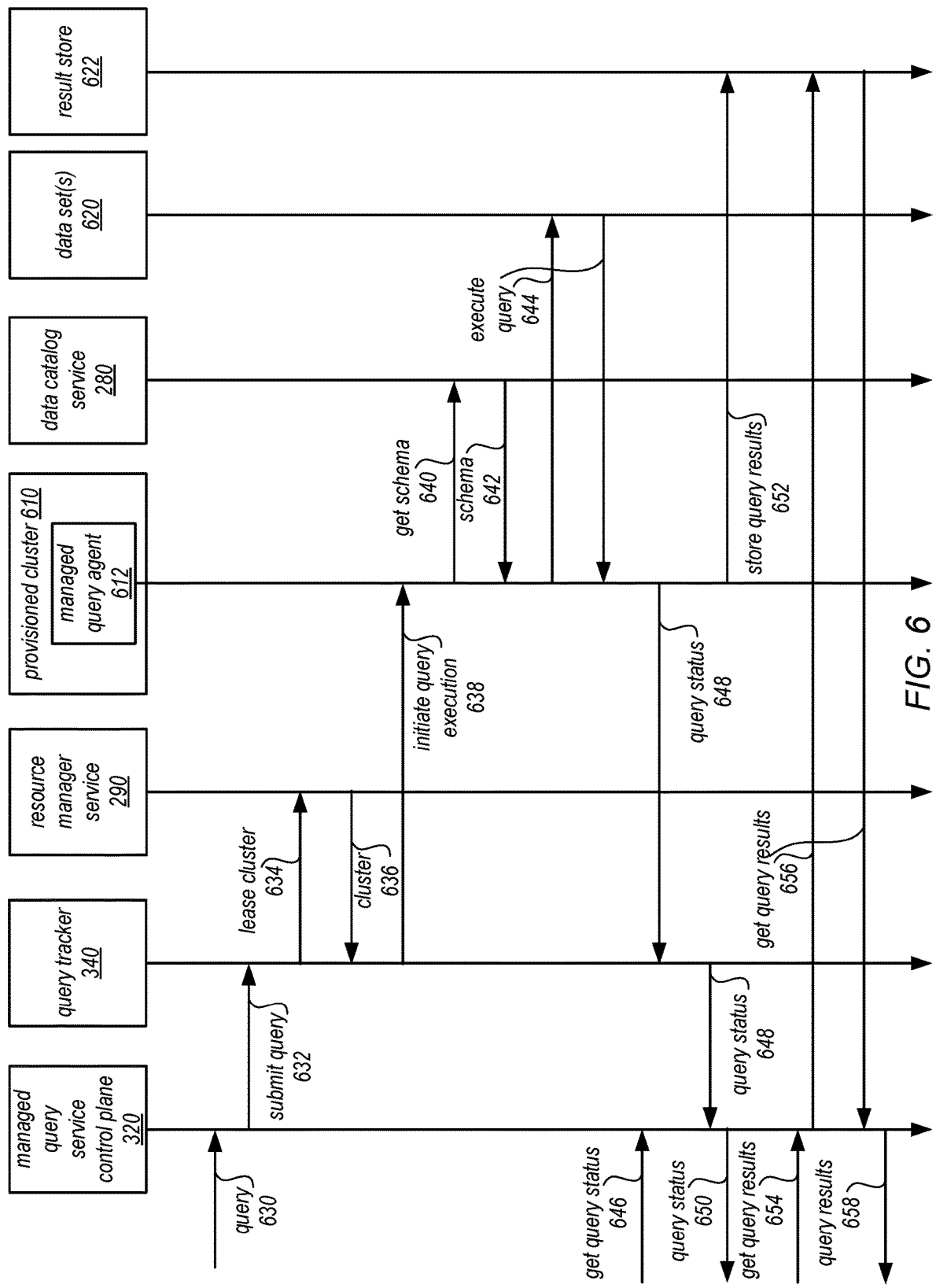
FIG. 6 is a sequence diagram for managed execution of queries, according to some embodiments.

FIG. 6 is a sequence diagram for managed execution of queries, according to some embodiments. Query 630 may be received at managed query service control plane 320 which may submit the query 632 to query tracker 340 indicating the selected cluster 636 for execution, in some embodiments. Query tracker 340 may lease a cluster 634 from resource management service 290, which may return a cluster 636. Resource management service 290 and query tracker 340 may maintain lease state information for resources that are leased by query tracker and assigned to execute received queries, in some embodiments. Query tracker 340 may then initiate execution of the query 638 at the provisioned cluster 610, sending a query execution instruction to a managed query agent 612, in some embodiments.

Managed query agent 612 may get schema 640 for the data sets(s) 620 from data catalog service 280, which may return the appropriate schema 642, in some embodiments. Provisioned cluster 610 can then generate a query execution plan and execute the query 644 with respect to data set(s) 620 according to the query plan. Managed query agent 612 may send query status 646 to query tracker 340 which may report query status 648 in response to get query status 646 request, sending a response 650 indicating the query status 650, in some embodiments. Provisioned cluster 610 may store the query results 652 in a result store 622 (which may be a data storage service 230), in some embodiments. Managed query service control plane 320 may receive a request to get a query results 654 and get query results 656 from results store 622 and provide the query results 658 in response, in some embodiments.

In at least some embodiments, queries submitted to managed query service 270 may include functions that may be identified for isolated execution. FIG. 7 is a logical block diagram illustrating interactions between a cluster processing a query and an event driven computing service to invoke isolated execution of functions, according to some embodiments. Cluster 710, like cluster 610 in FIG. 6 or cluster 810 in FIG. 8, may receive a query 702 for execution. Cluster 710 may implement one or more query engines which may identify a function included in query 702 for independent and/or isolated execution. For example, as discussed above with regard to FIG. 1, cluster 710 may examine the query and generate a parse tree or other data structure to determine the operations or functions requested in query 702, in one embodiment. Cluster 710 may recognize functions that are not included in the standard set of functions in the query language(s), interfaces, or protocols supported by a query engine implemented on cluster 710, in one embodiment.

Cluster 710 may get 730 function mappings 392 from isolated function execution 330 obtain information that maps the identified function to an isolated or independent resource that can perform the function, in one embodiment. For example, function mapping information include a function identifier that indicates a resource for executing the function as well as information to generate a request or otherwise cause performance of the identified function, in some embodiments. In at least some embodiments, cluster 710 may obtain function mappings 392 associated with a submitter of the query (e.g., function mappings associated with a user account, client, application, etc.). Cluster 710 may generate a query execution plan that includes various instructions to carry out the performance of query 702 (e.g., by performing cost-based optimizations and selections), in some embodiments. The query execution plan may include operations or instructions to independently perform and/or isolate the execution of the identified function, as discussed below with regard to FIG. 9B. For example, the operation may include the information to generate and send a request to invoke 712 or trigger the performance of function at event driven compute service 210. Cluster 710 may also perform various other operations to access data to execute query 702, such as discussed below with regard to FIG. 8. Event driven compute service 210 may provide function result(s)/error(s) 714, which may be handled by cluster 710 as part of executing query 702 (e.g., as discussed below with regard to FIG. 12. Cluster 710 may generate query results 704 based, at least in part, on the function result(s) 714.

In at least some embodiments, functions invoked 712 at event driven computer service 210 may invoke other operations 722 at other services, resources, systems, or devices 720. For example, the function may trigger a request to perform image data analysis for object recognition for an object located in a storage service identified by data provided as an input to the function (obtained by cluster 710). The other service, resource, system, or device 720 may then provide a result that identifies the object in the image data. The returned image identification 724 can be passed to cluster 710, which can use the image identification as value compared with a predicate (e.g., "SELECT x.item WHERE get_object_identity(item.object_location)='DOG'"). The operation results 724 can be provided to event driven compute service 210 to complete performance of the function, to other services, resources, systems, or devices, or directly to cluster 710, in some embodiments.

Figure 8:
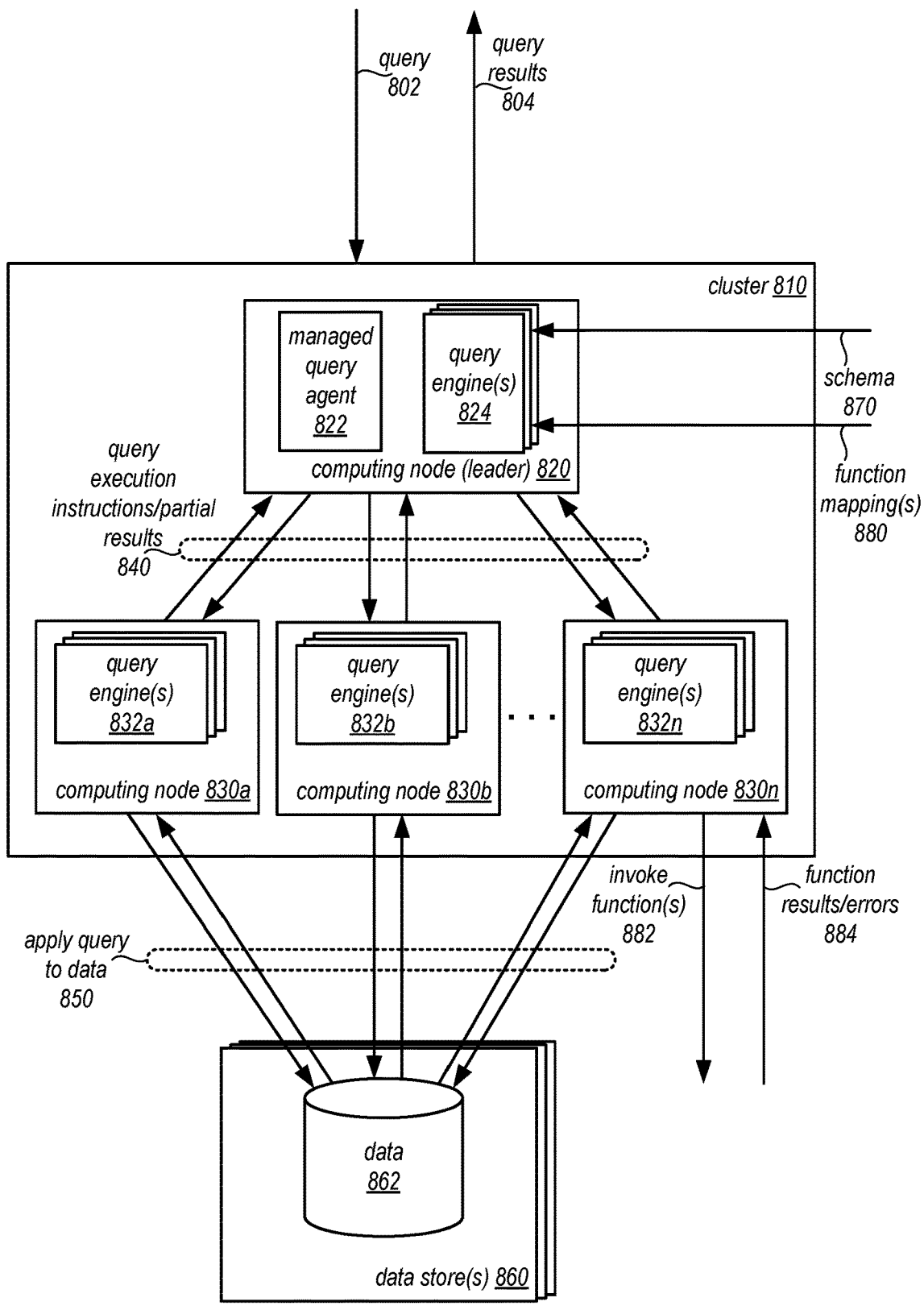
FIG. 8 is a logical block diagram illustrating a cluster processing a query as part of managed query execution, according to some embodiments.

Different types of computing resources may be provisioned and configured in resource pools to execute queries, in some embodiments. Single-node clusters or multi-node compute clusters may be one example of a type of computing resource provisioned and configured in resource pools by resource management service 290 to service queries for managed query service 270. FIG. 8 is a logical block diagram illustrating a cluster processing a query as part of managed query execution, according to some embodiments. Cluster 810 may implement a computing node 820 that is a leader node (according to the query engine 824 (or multiple query engines, such as Presto and Hive) implemented by cluster 810). In some embodiments, no single node may be a leader node, or the leader node may rotate from processing one query to the next. Managed query agent 822 may be implemented as part of leader node 820 in order to provide an interface between the provisioned resource, cluster 810, and other components of managed query service 270 and resource management service 290. For example, managed query agent 822 may provide further data to managed query service 270, such as the status of the query (e.g. executing, performing I/O, performing aggregation, etc.,) and execution metrics (e.g., health metrics, resource utilization metrics, cost metrics, length of time, etc.). In some embodiments, managed query agent 822 may provide cluster/query status and execution metric(s) to resource management service 290 (in order to make pool management decisions, such as modification events, lease requests, etc.). For example, managed query agent 822 may indicate cluster status to resource management service 290 indicating that a query has completed and that the cluster 810 is ready for reassignment.

Leader node 820 may implement query engine 824 to execute queries, such as query 802 which may be received via managed query agent 822. For instance, managed query agent may implement a programmatic interface for query tracker to submit queries (as discussed above in FIG. 6), and then generate and send the appropriate query execution instruction to query engine 824. Query engine(s) 824 may generate a query execution plan for received queries 803. In at least some embodiments, leader node 820, may obtain schema information for the data set(s) 870 from the data catalog service 280 or metadata stores for data 862 (e.g., data dictionaries, other metadata stores, other data processing services, such as database systems, that maintain schema information) for data 862, in order to incorporate the schema data into the generation of the query plan and the execution of the query. In some embodiments, leader node 820 may obtain function mapping(s) 880, as discussed above with regard to FIG. 7.

Leader node 820 may generate and send query execution instructions 840 to computing nodes that access and apply the query to data 862 in data store(s) 860. Compute nodes, such as nodes 830a, 830b, and 830n, may respectively implement query engines 832a, 832b, and 832n to execute the query instructions, apply the query to the data 850, and return partial results 840 to leader node 820, which in turn may generate and send query results 804. In at least some embodiments, instructions to compute nodes 840 may include instructions to perform isolated execution of a function. For example, computing node 830n may send requests to invoke execution of a function 882 and process results from the performance of the function 884 as part of processing the query execution instructions 840. Query engines 824 and query engines 832 may implement various kinds of distributed query or data processing frameworks, such as the open source Presto distributed query framework or the Apache Spark framework.

Figures 9A, 9B:
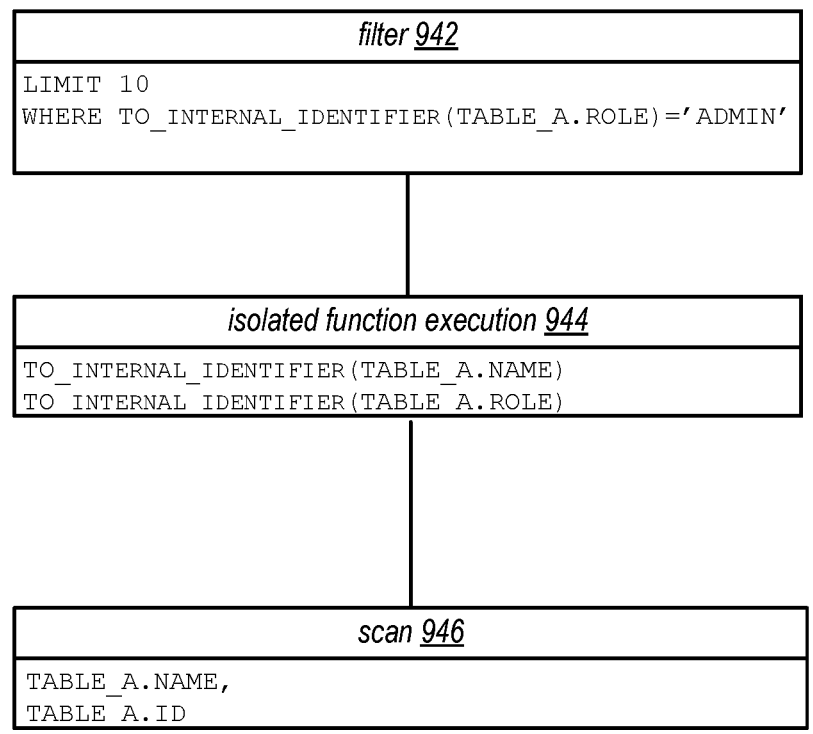
FIG. 9A illustrates an example query that includes a function identifier, according to some embodiments.
FIG. 9B illustrates an example query execution plan for a query that includes an isolated executed function, according to some embodiments.

FIG. 9A illustrates an example query that includes a function identifier, according to some embodiments. A query execution engine, like those discussed above with regard to FIGS. 1, 7, and 8, may receive such a query 910 (which may be submitted in Structured Query Language (SQL). For example, query 910 includes standard or supported functions or operations, SELECT and LIMIT, which may be recognized. Another function identifier 920, describing a function "TO_INTERNAL_IDENTIFIER" may not be recognized or supported. Instead, mapping information for the function identifier may be obtained in order to generate the appropriate operation in a query execution plan. For example, FIG. 9B illustrates an example query execution plan for a query that includes an isolated executed function, according to some embodiments.

The operations of the query execution plan may include scan operation 946, which may scan the data for TABLE_A to retrieve the NAME and ROLE values. Isolated function execution 944 may be assigned the responsibility to cause the execution of the identified function. For example, the invocation of TO_INTERNAL_IDENTIFIER for TABLE_A.NAME and TABLE_A.ROLE in operation 944 may cause the generation of a request formatted according to an interface for event driven compute service 210 and include the function identifier for TO_INTERNAL_IDENTIFIER along with the data values that are the input parameters for the function. In this way, a query engine can continue to perform the query execution plan with the expectation that TO_UPPER is being performed. Results from TO_UPPER can then be integrated in the filter operation 942, which may apply a predicate "ADMIN" to the function results. Filter operation 942 can also incorporate the LIMIT function of 10 items returned.

Figure 10:
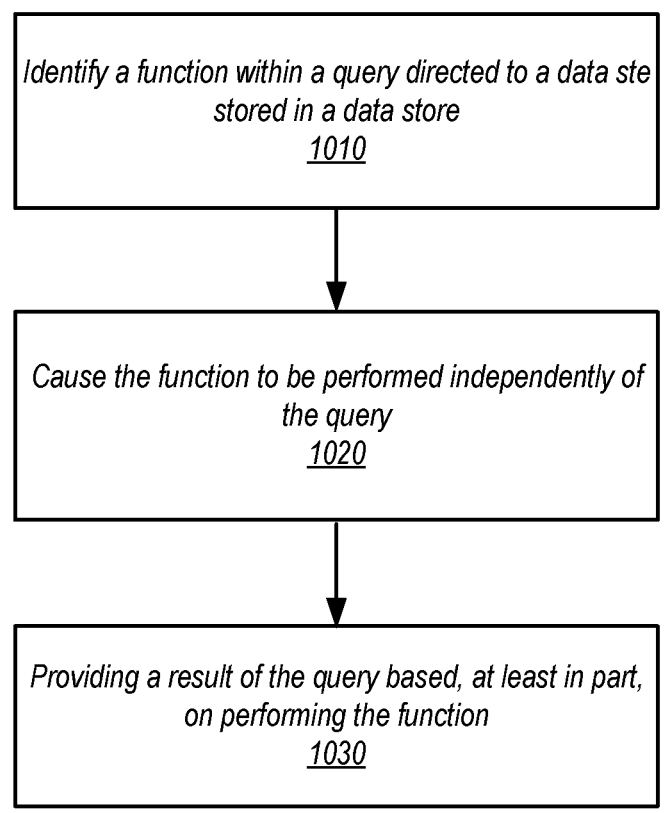
FIG. 10 is a high-level flowchart illustrating various methods and techniques to implement independently performing functions included in queries, according to some embodiments.

Although FIGS. 2-9B have been described and illustrated in the context of a provider network leveraging an event driven compute service to provide isolated execution for a function included in a query received at a managed query service, the various components illustrated and described in FIGS. 2-9B may be easily applied to other systems, or devices that perform queries. As such, FIGS. 2-9B are not intended to be limiting as to other embodiments of a system that may implement isolating the performance of functions included in queries. FIG. 10 is a high-level flowchart illustrating various methods and techniques to implement independently performing functions included in queries, according to some embodiments. Various different systems and devices may implement the various methods and techniques described below, either singly or working together. For example, a managed query service 270 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 1010, a function within a query directed to a data store may be identified in various embodiments. For example, the function may be identified as not supported by a query engine or other execution platform or environment that is processing the query. In some embodiments, a function name lookup or comparison may be performed with respect to implemented or loaded libraries, or other lists of supported functions. In some embodiments, the function may include a special identifier or combination of characters (e.g., a tag appended to the function) that identifies the function for isolated execution or may be identified in a query hint.

As indicated at 1020, the function may be caused to perform independently of the query, in various embodiments. For example, execution of the query may be separately managed, utilizing separate resources (e.g., memory, processor, network, etc.), with access to separate library(ies) or procedure(s) to implement the function. In some embodiments, the function may be specified according to code in a different language than that of the query (e.g., the function may be specified in Java, Javascript, or Python, while the query may be specified in SQL or HQL), in some embodiments. Independent performance of the query may include isolating the execution of the function (e.g., processes, threads, I/O channels, interconnects, etc.) from those resources that may be executing the query. Performance of the function may succeed or fail independent of the query, in some embodiments. In at least some embodiments, operations at other systems, services, components, or devices may be invoked as part of performing the function. Such operations may proceed whether or not the query that includes the function succeeds or fails (e.g., alarm events, data analysis, recording data, etc. may be performed with regard to the performance of the query), in some embodiments.

As indicated at 1030, a result of the query may be provided based, at least in part on performing the function, in various embodiments. For example, independently performed functions may perform a transformation of data values obtained from the data set as part of performing the query (e.g., from one data type to another, extract a portion of a larger value, convert the value from one measurement to another, etc.), a validation of data values obtained from the data set as part of performing the query (e.g., does the name, address, and identifier name represent an authorized user), an analysis of data values obtained from the data set as part of performing the query (e.g., statistical operations like time series analysis, aggregation operations, etc.) or any other operation that may be performed as part of the function such the results can be interpreted, processed, incorporated, or dependent on the function results, in some embodiments. Function results may be formatted for interpretation in a format expected by a query engine performing the query (e.g., results provided in supported data types or formats), in some embodiments.

Figure 11:
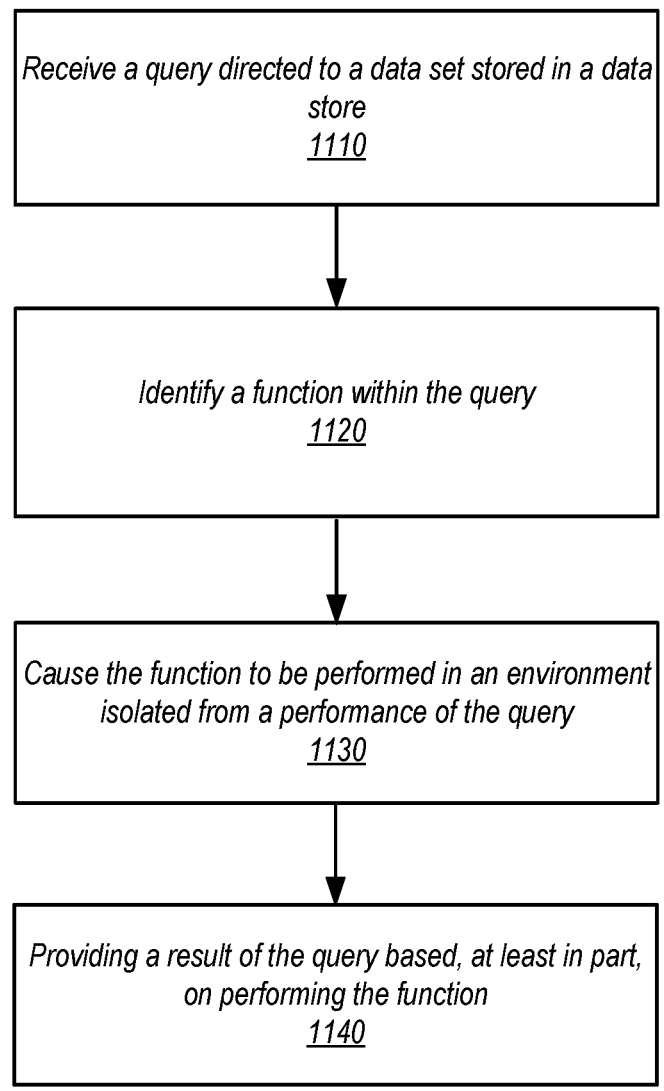
FIG. 11 is a high-level flowchart illustrating various methods and techniques to implement isolating performance of functions included in a query, according to some embodiments.

FIG. 11 is a high-level flowchart illustrating various methods and techniques to implement isolating performance of functions included in a query, according to some embodiments. As indicated at 1110, a query may be received that is directed to a data set stored in a data store. For example, a query may be received via the various types of interfaces described above with regard to FIG. 4 (programmatic, user console, driver, etc.), in one embodiment. A query may be formatted according to different query languages, or specifications of query languages including Structured Query Language (SQL) and/Hive Query Language (HQL). The query may include execution hints, specifying the type of query execution engine to utilize, query execution limits, or other parameters or properties for configuring the execution of the query, in some embodiments.

As indicated at 1120, a function may be identified within the query. For example, as discussed above with regard to FIG. 10, the function may be identified as not supported by a query engine or other execution platform or environment that is processing the query. In some embodiments, a function name lookup or comparison may be performed with respect to implemented or loaded libraries, or other lists of supported functions. In some embodiments, the function may include a special identifier or combination of characters (e.g., a tag appended to the function) that identifies the function for isolated execution or may be identified in a query hint.

As indicated at 1130, the function may be caused to perform in an environment isolated from a performance of the query, in various embodiments. For example, isolated computing resources or environments may include a separate software container, operating system sandbox, a separate virtual machine, a separate physical machine, a separate remote system, or a separate network service, each of which may offer varying levels of isolation. In some embodiments, a determination may be made as to which type of isolation level should be applied to the performance of the function (e.g., virtual or physical based on whether the function would be executing on a resource executing a different function for the submitter of the query or a different client). As discussed above with regard to FIGS. 1, 7, and 8, a request or other protocol for invoking the isolated execution of the function may be performed (e.g., by sending a request formatted for a separate service) or invoking a system call that triggers an operation to isolate the execution of the function, in some embodiments.

As indicated at 1140, a result of the query may be provided based, at least in part on performing the function, in various embodiments. Similar to the discussion above with regard to FIG. 10, functions performed in an environment isolated from the performance of the query may perform a transformation of data values obtained from the data set as part of performing the query (e.g., from one data type to another, extract a portion of a larger value, convert the value from one measurement to another, etc.), a validation of data values obtained from the data set as part of performing the query (e.g., does the name, address, and identifier name represent an authorized user), an analysis of data values obtained from the data set as part of performing the query (e.g., statistical operations like time series analysis, aggregation operations, etc.) or any other operation that may be performed as part of the function such the results can be interpreted, processed, incorporated, or dependent on the function results, in some embodiments. Function results may be formatted for interpretation in a format expected by a query engine performing the query (e.g., results provided in supported data types or formats), in some embodiments.

Figure 12:
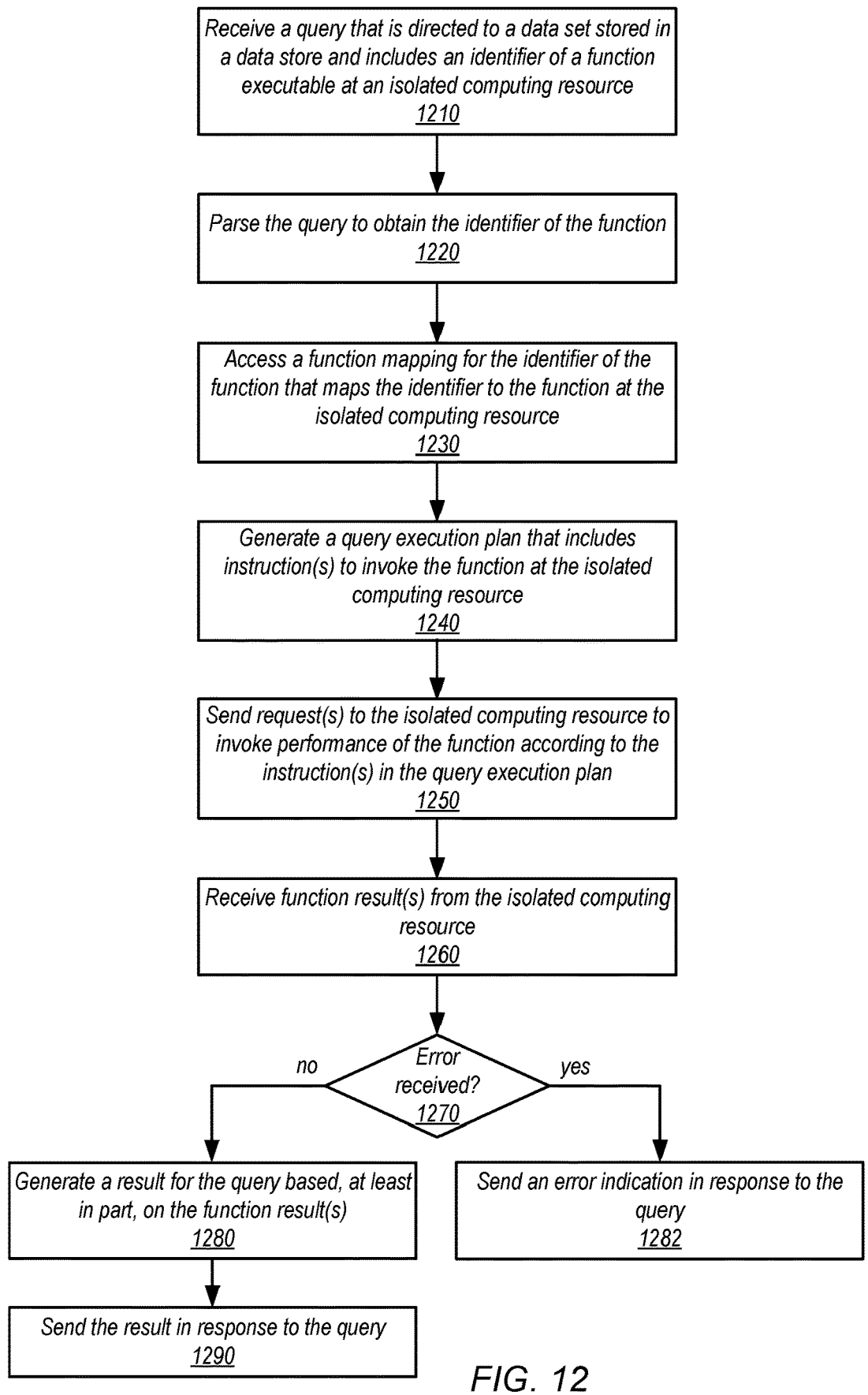
FIG. 12 is a high-level flowchart illustrating various methods and techniques to generate and perform a query execution plan that invokes a function at an isolated computing resource, according to some embodiments.

FIG. 12 is a high-level flowchart illustrating various methods and techniques to generate and perform a query execution plan that invokes a function at an isolated computing resource, according to some embodiments. As indicated at 1210, a query may be received that is directed to a data set stored in a data store. For example, a query may be received via the various types of interfaces described above with regard to FIG. 4 (programmatic, user console, driver, etc.), in one embodiment. A query may be formatted according to different query languages, or specifications of query languages including Structured Query Language (SQL) and/ Hive Query Language (HQL). The query may include execution hints, specifying the type of query execution engine to utilize, query execution limits, or other parameters or properties for configuring the execution of the query, in some embodiments. The query may include an identifier of a function executable at an isolated computing resource, in some embodiments. For example, a function identifier, such as the function identifiers included in function mapping data discussed above with regard to FIGS. 5 and 7 may be included in the query.

As indicated at 1220, the query may be parsed to obtain the identifier of the function, in some embodiments. For example, a parse tree or graph may be created where each operation, operator, or other portion of the query is divided into separate portions that can be analyzed (e.g., by examining query delimiters like commas, parentheses, brackets).

In some embodiments, the identifier of the function may be self-identifying (as it may be different from known or supported functions) or the function may have external information (e.g., such as a query hint included in another portion of the query) which may identify the function.

As indicated at 1230, a function mapping for the identifier of the function that maps the identifier to the function at the isolated computing resource may be accessed. For example, a request may be sent to a store that maintains function mappings associated with different users, accounts, or clients, identifying the user, account, or client associated with the query. Function mappings created by or associated with the user, account, or client may be returned in response to the request, in some embodiments. In some embodiments, function mappings may be pre-loaded or sent when the query is dispatched to the query engine or other resources processing the query (e.g., when the query tracker dispatches the query to a cluster in FIG. 6 above).

As indicated at 1240, a query execution plan may be generated that includes instructions to invoke performance of the function at the isolated computing resource, in various embodiments. For example, as illustrated in FIG. 9B above, different operations or instructions to perform different portions of the query may be determined. Dependencies between operations, including dependencies on functions identified for isolated execution, may be evaluated in order to generate a query execution plan that is optimized to lower performance costs. For example, if a predicate evaluation between two different operations can be applied without performing the identified function and reducing the number of times that the identified function is performed, then a query execution plan that provides that ordering of operations may be selected as it reduces the number of times the function is invoked (which may be more costly due to the isolated nature of the computing resource performing the function).

The generated instructions in the query plan may include the information to invoke the function at the isolated computing resource, in some embodiments. For example, authorization or identity credentials, parameter configurations, performance configuration variables, or other information for performing the function may be included in the query execution plan to generate a request to invoke the function, in some embodiments. As indicated at 1250, request(s) to the isolated computing resource may be sent to invoke the function according to the instructions in the query execution plan, in various embodiments.

As indicated at 1260, function result(s) may be received from the isolated computing resource, in various embodiments. If the results include an error, as indicated by the positive exit from 1270, then an error indication may be sent in response to the query, as indicated aby 1282, in some embodiments. In other embodiments, an evaluation of the error may be performed as to whether performance of the query can continue without that function result or if a retry of the function should be attempted. As indicated by the negative exit from 1270, a result for the query may be generated based, at least in part on the function result(s), as indicated at 1280, in some embodiments (e.g., similar to the techniques discussed above with regard to FIGS. 10 and 11). The result may then be sent in response to the query, as indicated at 1290, in various embodiments.

The methods described herein may in various embodiments be implemented by any combination of hardware and software. For example, in one embodiment, the methods may be implemented by a computer system (e.g., a computer system as in FIG. 15) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 13:
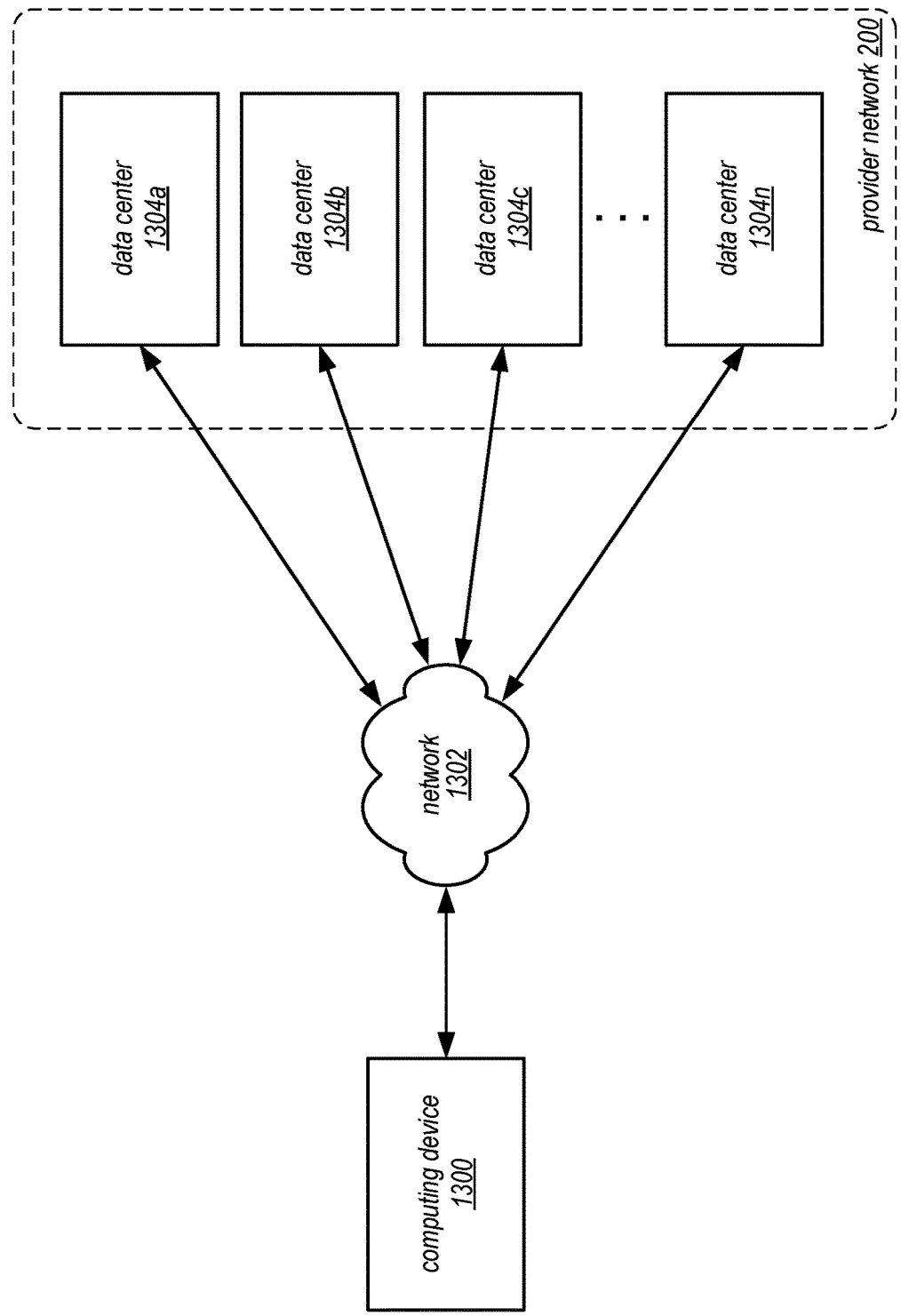
FIG. 13 is a logical block diagram that shows an illustrative operating environment that includes a service provider network that can be configured to implement aspects of the functionality described herein, according to some embodiments.

FIG. 13 is a logical block diagram that shows an illustrative operating environment that includes a service provider network that can implement aspects of the functionality described herein, according to some embodiments. As discussed above, the service provider network 200 can provide computing resources, like VM instances and storage, on a permanent or an as-needed basis. Among other types of functionality, the computing resources provided by the service provider network 200 can be utilized to implement the various services described above. As also discussed above, the computing resources provided by the service provider network 200 can include various types of computing resources, such as data processing resources like VM instances, data storage resources, networking resources, data communication resources, network services, and the like.

Each type of computing resource provided by the service provider network 200 can be general-purpose or can be available in a number of specific configurations. For example, data processing resources can be available as physical computers or VM instances in a number of different configurations. The VM instances can execute applications, including web servers, application servers, media servers, database servers, some or all of the services described above, and/or other types of programs. The VM instances can also be configured into computing clusters in the manner described above. Data storage resources can include file storage devices, block storage devices, and the like. The service provider network 200 can also provide other types of computing resources not mentioned specifically herein.

The computing resources provided by the service provider network maybe implemented, in some embodiments, by one or more data centers 1304A-1304N (which might be referred to herein singularly as "a data center 1304" or in the plural as "the data centers 1304"). The data centers 1304 are facilities utilized to house and operate computer systems and associated components. The data centers 1304 typically include redundant and backup power, communications, cooling, and security systems. The data centers 1304 can also be located in geographically disparate locations. One illustrative configuration for a data center 1304 that can be utilized to implement the technologies disclosed herein will be described below with regard to FIG. 15.

The customers and other users of the service provider network 200 can access the computing resources provided by the service provider network 200 over a network 1302, which can be a wide area communication network ("WAN"), such as the Internet, an intranet or an Internet service provider ("ISP") network or a combination of such networks. For example, and without limitation, a computing device 1300 operated by a customer or other user of the service provider network 200 can be utilized to access the service provider network 200 by way of the network 1302. It should be appreciated that a local-area network ("LAN"), the Internet, or any other networking topology known in the art that connects the data centers 1304 to remote customers and other users can be utilized. It should also be appreciated that combinations of such networks can also be utilized.

Figure 14:
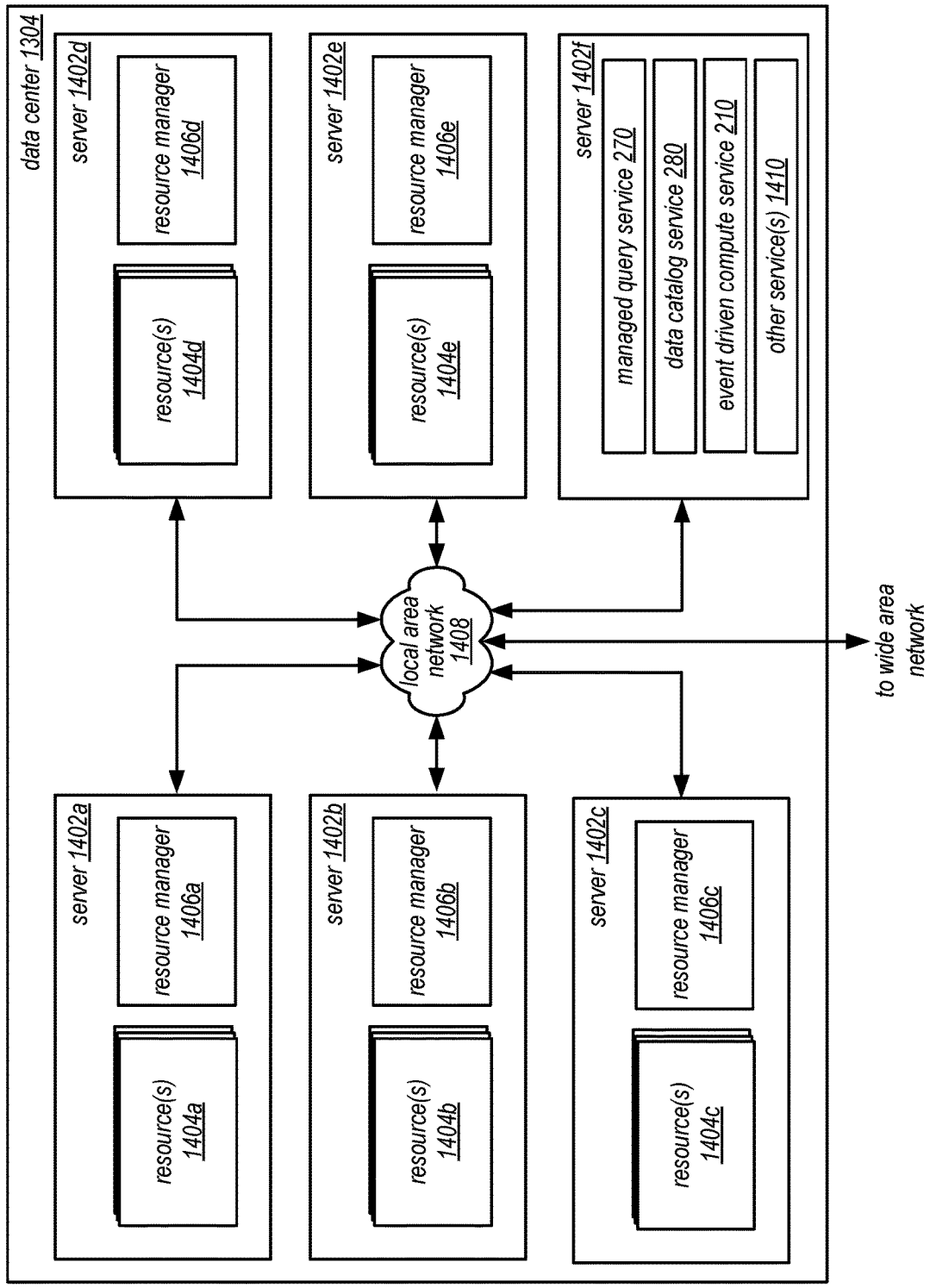
FIG. 14 is a logical block diagram illustrating a configuration for a data center that can be utilized to implement aspects of the technologies disclosed herein, according to some embodiments.

FIG. 14 is a logical block diagram illustrating a configuration for a data center that can be utilized to implement aspects of the technologies disclosed herein, according to various embodiments. is a computing system diagram that illustrates one configuration for a data center 1304 that implements aspects of the technologies disclosed herein for providing managed query execution, such as managed query execution service 270, in some embodiments. The example data center 1304 shown in FIG. 14 includes several server computers 1402A-1402F (which might be referred to herein singularly as "a server computer 1402" or in the plural as "the server computers 1402") for providing computing resources 1404A-1404E.

The server computers 1402 can be standard tower, rackmount, or blade server computers configured appropriately for providing the computing resources described herein (illustrated in FIG. 14 as the computing resources 1404A-1404E). As mentioned above, the computing resources provided by the provider network 200 can be data processing resources such as VM instances or hardware computing systems, computing clusters, data storage resources, database resources, networking resources, and others. Some of the servers 1402 can also execute a resource manager 1406 capable of instantiating and/or managing the computing resources. In the case of VM instances, for example, the resource manager 1406 can be a hypervisor or another type of program may enable the execution of multiple VM instances on a single server computer 1402. Server computers 1402 in the data center 1404 can also provide network services and other types of services, some of which are described in detail above with regard to FIG. 2.

The data center 1304 shown in FIG. 14 also includes a server computer 1402F that can execute some or all of the software components described above. For example, and without limitation, the server computer 1402F can execute various components for providing different services of a provider network 200, such as the managed query service 270, the data catalog service 280, event driven compute service 210, and other services 1410 (e.g., discussed above) and/or the other software components described above. The server computer 1402F can also execute other components and/or to store data for providing some or all of the functionality described herein. In this regard, it should be appreciated that the services illustrated in FIG. 14 as executing on the server computer 1402F can execute on many other physical or virtual servers in the data centers 1304 in various configurations.

In the example data center 1304 shown in FIG. 14, an appropriate LAN 1408 is also utilized to interconnect the server computers 1402A-1402F. The LAN 1408 is also connected to the network 1302 illustrated in FIG. 13. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1304A-1304N, between each of the server computers 1402A-1402F in each data center 1304, and, potentially, between computing resources in each of the data centers 1304. It should be appreciated that the configuration of the data center 1304 described with reference to FIG. 14 is merely illustrative and that other implementations can be utilized.

Figure 15:
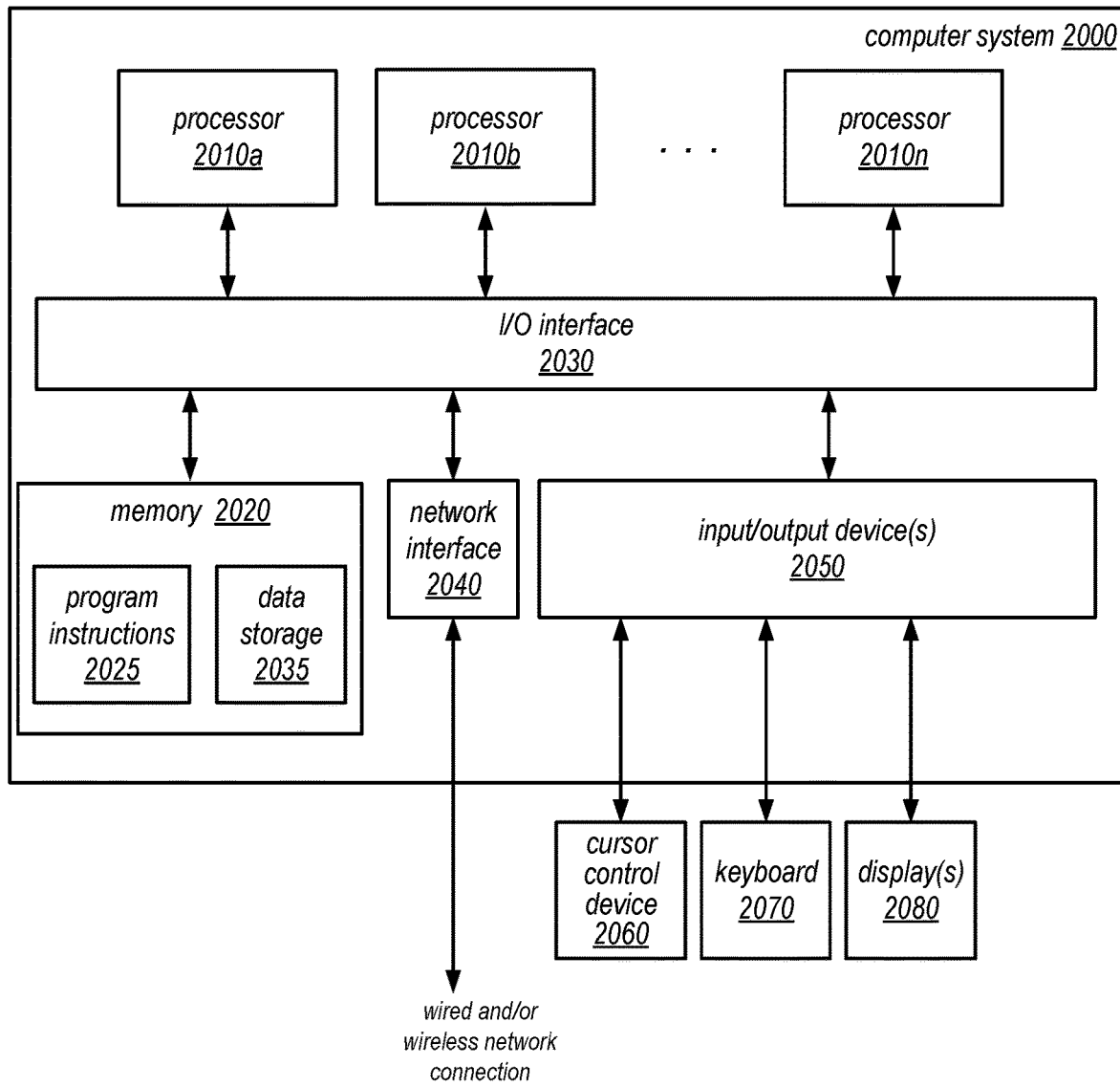
FIG. 15 illustrates an example system configured to implement the various methods, techniques, and systems described herein, according to some embodiments.

Embodiments of isolating performance of functions in queries as described herein may be executed on one or more computer systems, which may interact with various other devices. One such computer system is illustrated by FIG. 15. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system, compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s).

Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 15, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a memory to store program instructions which, if performed by at least one processor, cause the at least one processor to perform a method to at least:
        receive, from a client, a query directed to a data set stored in a data store, wherein the query received from the client includes a function named within the query;
        identify the function named within the query received from the client, wherein the named function comprises one or more operations comprising one or more of: a transformation of data values obtained from the data set, a validation of data values obtained from the data set, or an analysis of data values obtained from the data set;
        cause the query to be performed;
        cause the one or more operations of the named function to be performed in an environment isolated both from the performance of the query and from the client, wherein the performed one or more operations of the named function comprises one or more of: the transformation of the data values obtained from the data set, the validation of the data values obtained from the data set, or the analysis of the data values obtained from the data set; and
        generate a result of the query to provide to the client based, at least in part, on the performance of the query and on the performance of the function in the environment isolated from both the performance of the query and from the client.

2. The system of claim 1,
    wherein the identification of the function within the query comprises parsing the query to obtain an identifier for the function;
    wherein the method further comprises:
        access a function mapping for the identifier that maps the identifier to the function at an isolated computing resource;
        generate a query execution plan that includes an instruction to invoke the function at the isolated computing resource; and
    wherein to cause the function to be performed causes the function to be performed at the isolated computing resource according to the instruction.

3. The system of claim 1, wherein to cause the function to be performed in the environment isolated from the performance of the query comprises sending a request to invoke performance of the function to a remote computing resource.

4. The system of claim 3, wherein the remote computing resource is implemented as part of an event-driven compute service, wherein the query is received at a query engine implemented as part of a managed query service, wherein the event-driven compute service and the managed query service are implemented as part of a provider network, and wherein the request to invoke performance of the function is formatted according to a programmatic interface for the event-driven compute service.

5. A method, comprising:
    performing, by one or more computing devices:
        identifying a function named within a query received from a client and directed to a data set stored in a data store, wherein the named function comprises one or more operations comprising one or more of: a transformation of data values obtained from the data set, a validation of data values obtained from the data set, or an analysis of data values obtained from the data set;
        causing the query to be performed;
        causing the one or more operations of the named function to be performed independently of both the query and the client, wherein the performed one or more operations of the named function comprises one or more of: the transformation of the data values obtained from the data set, the validation of the data values obtained from the data set, or the analysis of the data values obtained from the data set; and
        generating a result of the query to provide to the client based, at least in part, on the performance of the query and on the performance of the named function independent of both the query and the client.

6. The method of claim 5,
    wherein identifying the function within the query comprises parsing the query to obtain an identifier for the function;

wherein the method further comprises:
    accessing a function mapping for the identifier that maps the identifier to the function at a remote computing resource;
    generating a query execution plan that includes an instruction to invoke the function at the remote computing resource; and
wherein causing the function to be performed comprises causing the function to be performed at the remote computing resource according to the instruction.

7. The method of claim 6, further comprising receiving a request to create the function mapping for the identifier that maps the identifier to the function.

8. The method of claim 6, further comprising sending an executable of the function to the remote computing resource.

9. The method of claim 6, wherein accessing the function mapping for the identifier comprises obtaining a plurality of function mappings including the function mapping that is associated with a submitter of the query.

10. The method of claim 5, wherein the query is formatted according to Structured Query Language (SQL).

11. The method of claim 5, wherein performance of the function sends a request to perform one or more operations to one or more other network-based services.

12. The method of claim 5, wherein causing the function to be performed independently of the query comprises sending a request to invoke performance of the function to a remote computing resource.

13. The method of claim 12, further comprising:
    identifying another function within a different query directed to the data set stored in the data store;
    sending a request to invoke performance of the other function to a different remote computing resource;
    receiving an error for the performance of the function from the different remote computing resource; and
    sending an error indication in response to the query.

14. A non-transitory, computer-readable storage medium, storing program instructions that when executed by one or more computing devices cause the one or more computing devices to implement:
    identifying a function named within a query received from a client and directed to a data set stored in a data store, wherein the named function comprises one or more operations comprising one or more of: a transformation of data values obtained from the data set, a validation of data values obtained from the data set, or an analysis of data values obtained from the data set;
    causing the query to be performed;
    causing the one or more operations of the named function to be performed in an environment isolated both from the performance of the query and from the client, wherein the performed one or more operations of the named function comprises one or more of: the transformation of the data values obtained from the data set, the validation of the data values obtained from the data set, or the analysis of the data values obtained from the data set; and
    generating a result of the query to provide to the client based, at least in part, on the performance of the query and on the performance of the named function in the environment isolated both from the performance of the query and from the client.

15. The non-transitory, computer-readable storage medium of claim 14,
    wherein identifying the function within the query comprises parsing the query to obtain an identifier for the function;
    wherein the program instructions cause the one or more computing devices to further implement:
        accessing a function mapping for the identifier that maps the identifier to the function at a remote computing resource;
        generating a query execution plan that includes an instruction to invoke the function at the remote computing resource; and
    wherein, in causing the function to be performed, the program instructions cause the one or more computing devices to implement causing the function to be performed at the remote computing resource according to the instruction.

16. The non-transitory, computer-readable storage medium of claim 15, wherein the program instructions cause the one or more computing devices to further implement receiving a request to create the function mapping for the identifier that maps the identifier to the function.

17. The non-transitory, computer-readable storage medium of claim 14, wherein the program instructions cause the one or more computing devices to further implement:
    identifying another function within a different query directed to the data set stored in the data store;
    causing the other function to be performed in the isolated environment;
    detecting an error for the performance of the other function; and
    providing an error indication in response to detecting the error.

18. The non-transitory, computer-readable storage medium of claim 14, wherein the function is included as a parameter within another function in the query that is not performed in the isolated environment.

19. The non-transitory, computer-readable storage medium of claim 14, wherein, in causing the function to be performed independently of the query, the program instructions cause the one or more computing devices to implement sending a request to invoke performance of the function to a remote computing resource.

20. The non-transitory, computer-readable storage medium of claim 19, wherein the remote computing resource is implemented as part of an event-driven compute service offered as part of a provider network, and wherein the request to invoke performance of the function is formatted according to a programmatic interface for the event-driven compute service.

* * * * *